US009656383B2

(12) United States Patent
Savage et al.

(10) Patent No.: US 9,656,383 B2
(45) Date of Patent: May 23, 2017

(54) DIRECT ACCESS DISPENSING SYSTEM

(75) Inventors: Kent V. Savage, Morrow, OH (US);
Benjamin V. Savage, Loveland, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 280 days.

(21) Appl. No.: 13/314,778

(22) Filed: Dec. 8, 2011

(65) Prior Publication Data

US 2012/0200385 A1 Aug. 9, 2012

Related U.S. Application Data

(60) Provisional application No. 61/421,056, filed on Dec. 8, 2010.

(51) Int. Cl.
| | |
|---|---|
| *B60R 25/00* | (2013.01) |
| *B25H 3/00* | (2006.01) |
| *B25H 3/06* | (2006.01) |
| *G06Q 10/08* | (2012.01) |
| *G07F 11/62* | (2006.01) |

(52) U.S. Cl.
CPC ............ *B25H 3/00* (2013.01); *B25H 3/06* (2013.01); *G06Q 10/087* (2013.01); *G06Q 10/0875* (2013.01); *G07F 11/62* (2013.01)

(58) Field of Classification Search
CPC .......... B25H 3/00; B25H 3/06; G06Q 10/087; G06Q 10/0875; G07F 11/62
USPC ..... 340/5.7, 5.2, 5.73, 5.8, 568.1; 726/9, 35; 221/2, 92
See application file for complete search history.

(56) References Cited

U.S. PATENT DOCUMENTS

| | | | | |
|---|---|---|---|---|
| 3,884,386 | A * | 5/1975 | Urcola | G06Q 20/342 194/906 |
| 4,194,647 | A * | 3/1980 | Spurrier | A47F 1/10 221/197 |
| 4,560,088 | A | 12/1985 | Tan | |
| 4,629,090 | A * | 12/1986 | Harris | G07F 5/18 221/150 R |
| 4,676,074 | A * | 6/1987 | Morgan, Jr. | G07F 11/30 221/150 R |
| 5,313,393 | A | 5/1994 | Varley et al. | |
| 5,385,265 | A | 1/1995 | Schlamp | |

(Continued)

OTHER PUBLICATIONS

PCT, International Search Report and Written Opinion, PCT/US2011/063940 (Apr. 5, 2012).

(Continued)

*Primary Examiner* — Quang D Pham
(74) *Attorney, Agent, or Firm* — Thompson Hine LLP

(57) ABSTRACT

An access and storage system including a storage component configured to store items therein or thereon in an associated storage position, wherein the storage component is configured to provide a user direct manual access to the items in the storage positions. The system further includes a sensor system configured to track at least one of the user's removal of an item from the associated storage position or replacement of an item to the associated storage position and an identification system for identifying the user. The system also has an authorization database operatively coupled to the identification system for tracking which of the items a particular identified user is authorized to access.

11 Claims, 18 Drawing Sheets

(56) References Cited

U.S. PATENT DOCUMENTS

| | | | |
|---|---|---|---|
| 5,564,803 A * | 10/1996 | McDonald | A61G 12/001 312/215 |
| 5,638,985 A * | 6/1997 | Fitzgerald et al. | 221/125 |
| 5,725,096 A * | 3/1998 | Winnard | 206/350 |
| 5,788,115 A * | 8/1998 | Halliburton | G07F 9/02 221/155 |
| 5,886,634 A * | 3/1999 | Muhme | 340/572.1 |
| 5,905,653 A | 5/1999 | Higham et al. | |
| 5,931,340 A | 8/1999 | Savage et al. | |
| 6,011,999 A * | 1/2000 | Holmes | 700/231 |
| 6,107,928 A * | 8/2000 | Gatti | A47B 69/00 340/568.1 |
| 6,173,582 B1 * | 1/2001 | Hixson | A47F 1/087 62/3.64 |
| 6,182,453 B1 * | 2/2001 | Forsberg | B01D 5/0072 62/125 |
| 6,232,877 B1 * | 5/2001 | Ashwin | 340/572.1 |
| 6,269,285 B1 | 7/2001 | Mignault | |
| 6,330,856 B1 | 12/2001 | Fitzgerald et al. | |
| 6,345,852 B1 * | 2/2002 | McCarthy | B60P 3/0257 296/22 |
| 6,347,847 B1 * | 2/2002 | Tiramani | B25H 3/00 190/18 A |
| 6,360,140 B1 * | 3/2002 | Vidondo | G07F 11/58 221/129 |
| 6,381,966 B1 * | 5/2002 | Barrow | B60N 3/104 221/150 R |
| 6,418,416 B1 | 7/2002 | Rosenberg et al. | |
| 6,502,718 B2 | 1/2003 | Fitzgerald et al. | |
| 6,648,153 B2 | 11/2003 | Holmes | |
| 6,786,303 B2 * | 9/2004 | Allen | B60N 3/10 186/32 |
| 6,827,275 B2 * | 12/2004 | Allen | 235/487 |
| 6,840,451 B2 * | 1/2005 | Allen | 235/462.09 |
| 6,862,896 B1 * | 3/2005 | Seidl | F25D 3/08 220/592.16 |
| 6,989,749 B2 * | 1/2006 | Mohr | 340/572.1 |
| 6,994,409 B2 | 2/2006 | Godlewski | |
| 7,044,344 B2 * | 5/2006 | Winkler | A63B 71/00 224/274 |
| 7,142,944 B2 | 11/2006 | Holmes | |
| 7,293,673 B2 | 11/2007 | Savage et al. | |
| 7,336,174 B1 * | 2/2008 | Maloney | 340/572.1 |
| 7,349,858 B1 * | 3/2008 | McGrady et al. | 705/3 |
| 7,418,311 B1 * | 8/2008 | Lagassey | G07F 9/026 221/150 R |
| 7,474,938 B2 | 1/2009 | Poliner | |
| 7,639,136 B1 * | 12/2009 | Wass | G06Q 10/08 340/572.1 |
| 7,657,344 B2 | 2/2010 | Holmes et al. | |
| 7,757,890 B2 * | 7/2010 | Alford | G07F 11/18 221/151 |
| 7,809,470 B2 * | 10/2010 | Shoenfeld | 700/243 |
| 7,810,350 B2 * | 10/2010 | Shelton | A45F 3/04 62/371 |
| 7,885,725 B2 * | 2/2011 | Dunn | G06F 19/3462 700/236 |
| 7,925,375 B2 | 4/2011 | Schininger et al. | |
| 8,090,472 B2 | 1/2012 | Schifman et al. | |
| 8,123,071 B2 | 2/2012 | Fitzgerald et al. | |
| 8,145,351 B2 | 3/2012 | Schininger et al. | |
| 8,201,737 B1 * | 6/2012 | Palacios Durazo | G06Q 10/087 235/383 |
| 8,207,816 B2 * | 6/2012 | Crigger et al. | 340/5.52 |
| 8,229,802 B2 | 7/2012 | Henry | |
| 8,342,400 B1 | 1/2013 | Reese | |
| 8,353,456 B2 * | 1/2013 | Jackson et al. | 235/454 |
| 8,358,198 B2 * | 1/2013 | Harper et al. | 340/5.7 |
| 8,442,878 B2 | 5/2013 | Henry | |
| 8,459,496 B2 * | 6/2013 | Simson | G07F 11/16 221/124 |
| 8,517,214 B2 * | 8/2013 | Lowry | A47F 1/082 221/124 |
| 8,676,377 B2 | 3/2014 | Siegel et al. | |
| 8,812,378 B2 | 8/2014 | Swafford et al. | |
| 2002/0105425 A1 | 8/2002 | Holmes | |
| 2002/0107744 A1 * | 8/2002 | Rosenberg | G07C 9/00111 705/18 |
| 2003/0001466 A1 * | 1/2003 | Herrington | 312/215 |
| 2004/0046020 A1 * | 3/2004 | Andreasson et al. | 235/385 |
| 2004/0207512 A1 * | 10/2004 | Bastian, II | 340/5.92 |
| 2006/0000788 A1 * | 1/2006 | Sholem | B25H 3/04 211/70.6 |
| 2006/0090909 A1 * | 5/2006 | Carter | 172/111 |
| 2006/0208881 A1 * | 9/2006 | Suzuki | 340/539.27 |
| 2006/0276933 A1 * | 12/2006 | Chavez et al. | 700/237 |
| 2007/0023193 A1 * | 2/2007 | King | 166/387 |
| 2007/0135965 A1 * | 6/2007 | Nguyen et al. | 700/231 |
| 2007/0251521 A1 * | 11/2007 | Schackmuth | G06Q 50/12 126/369 |
| 2008/0047282 A1 * | 2/2008 | Bodin | G06Q 10/08 62/129 |
| 2008/0052200 A1 * | 2/2008 | Bodin | G06Q 10/087 705/28 |
| 2008/0052201 A1 * | 2/2008 | Bodin | G06Q 10/087 705/28 |
| 2008/0055084 A1 * | 3/2008 | Bodin et al. | 340/572.1 |
| 2008/0059338 A1 * | 3/2008 | Hubbard | 705/28 |
| 2008/0088454 A1 * | 4/2008 | Flores et al. | 340/572.4 |
| 2008/0097803 A1 * | 4/2008 | Chirnomas | 705/7 |
| 2008/0121650 A1 * | 5/2008 | Smith | 221/129 |
| 2008/0122615 A1 * | 5/2008 | Shoenfeld | 340/540 |
| 2008/0149656 A1 * | 6/2008 | Yuyama et al. | 221/2 |
| 2008/0215461 A1 * | 9/2008 | Bodin et al. | 705/28 |
| 2008/0264967 A1 | 10/2008 | Schifman et al. | |
| 2009/0071854 A1 * | 3/2009 | Martin | 206/373 |
| 2009/0072029 A1 | 3/2009 | Martin | |
| 2009/0091453 A1 * | 4/2009 | Ishida et al. | 340/572.1 |
| 2009/0114672 A1 | 5/2009 | Schifman et al. | |
| 2009/0222359 A1 | 9/2009 | Henry | |
| 2009/0244281 A1 * | 10/2009 | Hiromasa | 348/143 |
| 2009/0261549 A1 * | 10/2009 | Kral | 280/47.35 |
| 2010/0007464 A1 * | 1/2010 | McTigue | G06Q 10/087 340/10.1 |
| 2010/0039513 A1 | 2/2010 | Glickman et al. | |
| 2010/0046791 A1 * | 2/2010 | Glickman et al. | 382/100 |
| 2010/0114369 A1 * | 5/2010 | Higham | 700/237 |
| 2010/0169196 A1 * | 7/2010 | De Luca | G06Q 30/04 705/34 |
| 2010/0237091 A1 | 9/2010 | Garson et al. | |
| 2010/0252626 A1 * | 10/2010 | Elizondo | G06Q 10/087 235/385 |
| 2010/0277277 A1 * | 11/2010 | Green | G07C 9/00111 340/5.72 |
| 2010/0282840 A1 * | 11/2010 | Henry | 235/382 |
| 2010/0295424 A1 | 11/2010 | Alexander | |
| 2011/0006074 A1 | 1/2011 | Machers | |
| 2011/0010275 A1 * | 1/2011 | Hull | 705/28 |
| 2011/0068922 A1 * | 3/2011 | Ross | 340/572.1 |
| 2011/0106681 A1 * | 5/2011 | Cockerell et al. | 705/35 |
| 2012/0031922 A1 * | 2/2012 | Johnson | A47K 5/1217 222/23 |

OTHER PUBLICATIONS

PCT, International Search Report and Written Opinion, PCT/US2011/063942 (Apr. 18, 2012).

Apex Industrial Technologies brochure entitled "The Next-Generation Internet-Based and 'Behind-The-Firewall' Industrial Vending Systems" (Dec. 8, 2008).

Apex Industrial Technologies brochure entitled "The All-New Apex SkyHook™ Internet-Based Industrial Vending System" (2010).

Apex Industrial Technologies brochure entitled "Ease of Implementation: An Overview of the Apex Solution Point-Of-Work Technologies" (2009).

Apex Industrial Technologies brochure entitled "Issues and Considerations in Calculating Economic and Operating Benefits from Point-Of-Work Implementations Point-Of-Work Technologies" (2009).

(56) References Cited

OTHER PUBLICATIONS

Apex Industrial Technologies brochure entitled Productivity soars, bottom line grows with point-of-work dispensing Point-Of-Work Technologies (2009).
Apex Industrial Technologies brochure entitled "Edge 5000 Series Case Study Manufacturer cuts down on its cutting-tool spend" (2010).
Apex Industrial Technologies brochure entitled "Edge 5000 Series Case Study Point-of-work vending helps preserve auto industry jobs" (2010).
Apex Industrial Technologies brochure entitled "Edge 5000 Series Case Study Consumption of safety glasses and gloves reduced by thousands" (2010).
Apex Industrial Technologies brochure entitled "Edge 5000 Series Case Study JBT Food Tech: Using too many gloves, spending too much time" (2010).
Office Action, U.S. Appl. No. 13/314,768 (Jul. 3, 2013).
Office Action, U.S. Appl. No. 13/314,768 (Jan. 2, 2014).
Advisory Action, U.S. Appl. No. 13/314,768 (Mar. 10, 2014).
European Search Report and European Search Opinion, European Application No. 11847444.4, May 4, 2015.
European Search Report and European Search Opinion, European Application No. 11846837.0, May 4, 2015.
U.S. Appl. No. 13/314,768, Office Action dated Dec. 31, 2014.
U.S. Appl. No. 14/096,193, Office Action dated Jan. 14, 2015.
U.S. Appl. No. 14/096,199, Office Action dated Jan. 14, 2015.
SG 2013044466, Written Opinion dated Aug. 1, 2014.
SG 2013044490, Written Opinion dated Aug. 7, 2014.
SG 2013044490, Written Opinion dated Feb. 24, 2015.
US, Final Office Action; U.S. Appl. No. 13/314,768 (Jul. 20, 2015).
US, Final Office Action; U.S. Appl. No. 14/096,193 (Jul. 30, 2015).
US, Final Office Action; U.S. Appl. No. 14/096,199 (Jul. 30, 2015).
EP, First Office Action, European Patent Application No. 11847444.4; (Feb. 10, 2016).
EP, First Office Action, European Patent Application No. 11846837.0; (Feb. 10, 2016).
AU, Patent Examination Report No. 1, Patent Application No. 2011338301 (Dec. 5, 2015).
AU, Patent Examination Report No. 1, Patent Application No. 2011338299 (Dec. 7, 2015).
EP, Second Office Action, European Patent Application No. 11847444.4 (Jul. 28, 2016).

\* cited by examiner

CUT-OUT DISPENSER

CUT-OUT DISPENSER

DIRECT ACCESS DISPENSING SYSTEM

This application claims priority to U.S. Provisional Patent Application Ser. No. 61/421,056, filed on Dec. 8, 2010, the entire contents of which are incorporated herein by reference.

The present invention is directed to a dispensing system, and more particularly, to a dispensing system that provides a user direct access to the items being dispensed.

BACKGROUND

In industrial workplaces, assembly operations, maintenance and repair operations, institutions, healthcare facilities and other environments, workers often have a recurring need to access and replenish their supplies. Historically, the worker would leave his or her work area, walk to a tool crib or store room, and request the desired item from the tool crib attendant or storeroom clerk. The tool crib attendant would write down the request, manually pick up the desired item from a shelf, and hand it to the worker. The worker would then return to his or her work area with the requested item, and the attendant would then enter the dispensing event into a record-keeping system. The procurement or purchasing department of the company would typically manually check inventory levels to determine when new supplies needed to be ordered.

However, such a system is time consuming and inefficient since the worker loses productivity by walking to and from the tool crib or storeroom and waiting for the attendant to get the supplies. In addition, the attendant would often manually write down the request and enter the request/dispensing event into a computer system, requiring extra labor and increasing the chances of human error. The tool crib attendant's duties also incur additional labor, and the tool crib or storeroom requires extra space. Finally, manually checking inventory levels is a time consuming, costly and error-prone process. This, in turn, requires that inventory levels be increased to provide a buffer inventory or "safety stock" which is costly, inefficient and wasteful. Certain industrial vending systems may address and alleviate some of these issues, but still present various inefficiencies in their use.

SUMMARY

In one embodiment the present invention is an access and storage system including a storage component configured to store items therein or thereon in an associated storage position, wherein the storage component is configured to provide a user direct manual access to the items in the storage positions. The system further includes a sensor system configured to track at least one of the user's removal of an item from the associated storage position or replacement of an item to the associated storage position and an identification system for identifying the user. The system also has an authorization database operatively coupled to the identification system for tracking which of the items a particular identified user is authorized to access.

DETAILED DESCRIPTION

Figure 1:
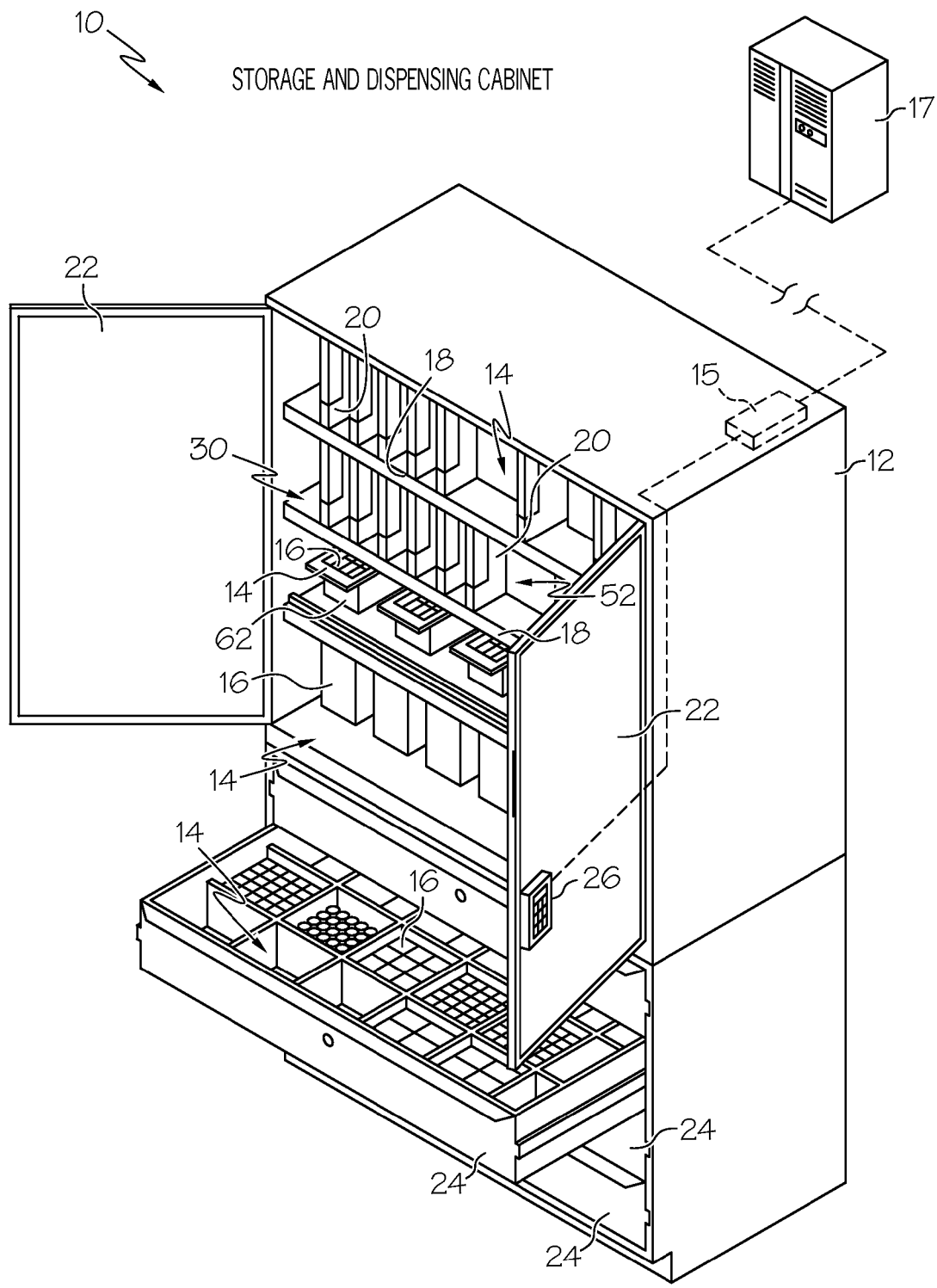
FIG. 1 is a front perspective view of one embodiment of a storage and dispensing cabinet.

In one embodiment, the present invention takes the form of, or includes, an access and storage system including a storage component configured to store items therein or thereon. As shown in FIG. 1, in one embodiment the access and storage system 10 includes a storage component in the form of a dispensing cabinet 12 having various dispensers/compartments 14 which can be selectively accessed by a user or users. Each compartment 14 can be considered a secure storage area that can store one or a plurality of items, supplies, tools, components, parts, ingredients, kits, consumables, or the like 16 (collectively termed "items" herein) which can take any of a wide variety of forms, depending upon the industry and setting in which the cabinet 12 is utilized.

In the embodiment of FIG. 1, the upper compartments 14 of the storage cabinet 12 are defined by a plurality of horizontally-extending shelves 18 and vertically-extending dividers 20. The front of the upper compartments 14 are selectively covered by a pair of doors 22 which can be moved between the open positions shown in FIG. 1, and closed positions in which the doors 22 extend across and cover the upper compartments 14. When the doors 22 are closed the doors 22 block outside access to the upper compartments 14. The doors 22 may be able to be locked in their closed position to control access to the compartments 14. The doors 22 may be generally clear or transparent to allow a user to see the compartments 14 and the items 16 stored therein. However, the doors 22 may instead be fully or partially opaque for security or other reasons. The doors 22 may also be made of an expanded or mesh-type material, providing for some visibility and free air flow and increased ventilation in the cabinet 12.

The storage cabinet 12 of FIG. 1 includes a plurality of sliding drawers 24 which can be opened (in some cases, only when authorized) to allow access to the associated compartments 14 and items 16 stored therein. Each drawer 24 may itself have internal covers, doors or panels (not shown) which control access to one or more discrete compartments 14 thereof, and/or whose opening and closed can be sensed and/or controller. The contents of the storage cabinet 12 may be illuminated, such as by an LED lighting system or the like to increase visibility of the compartments 14 and items 16.

Figure 2:
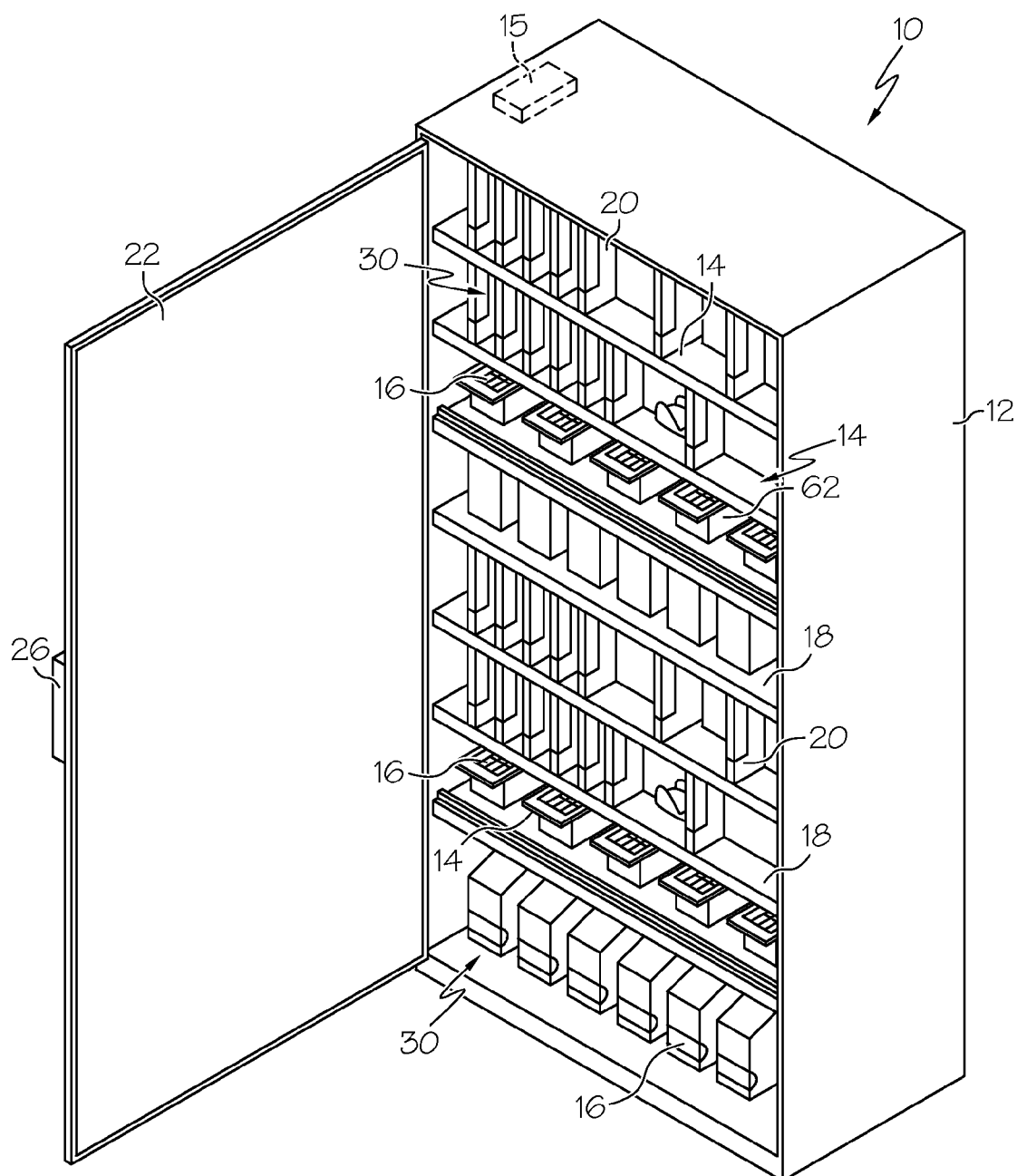
FIG. 2 is a front perspective view of an alternate storage and dispensing cabinet.
Figure 3:
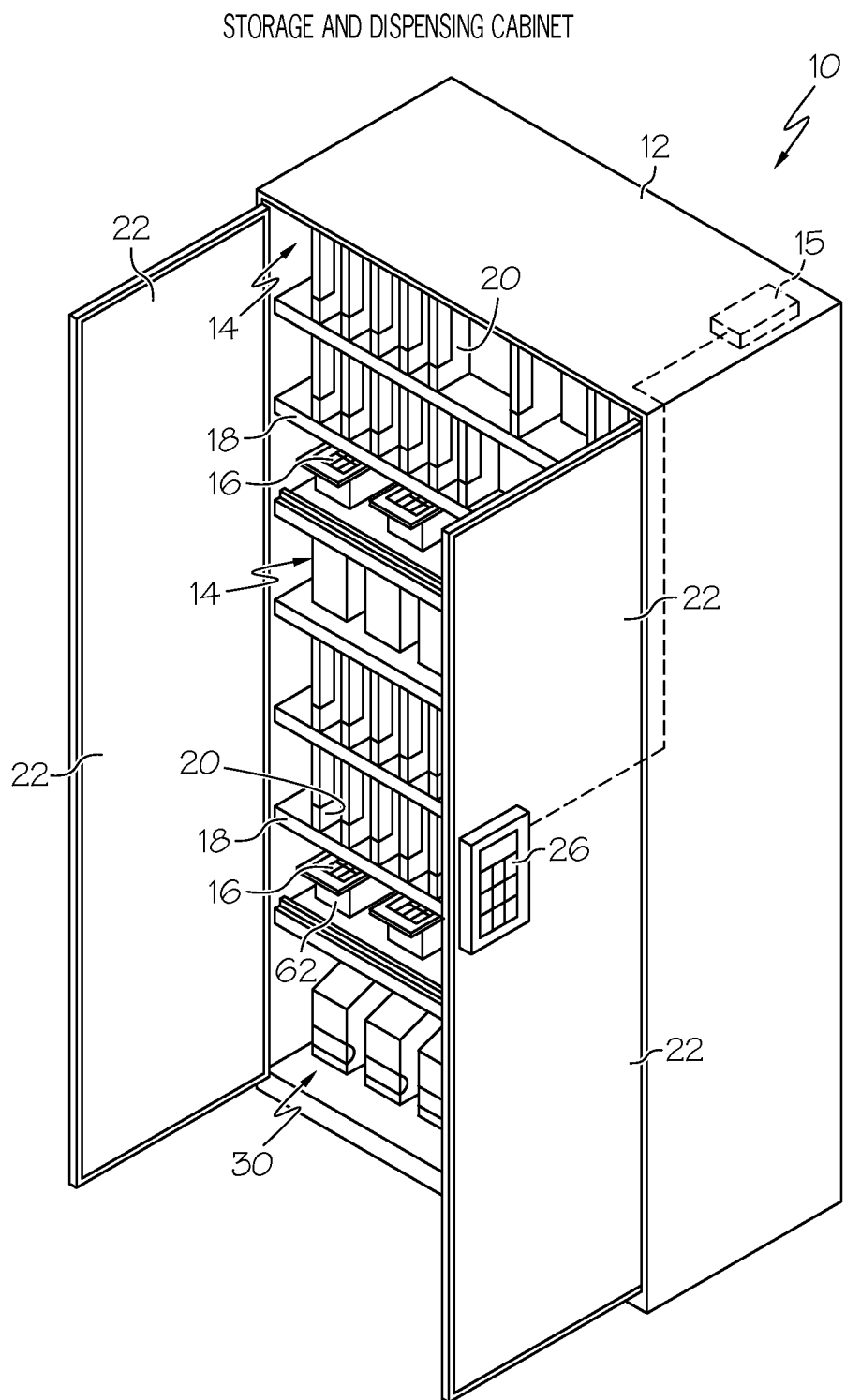
FIG. 3 is a front perspective view of another storage and dispensing cabinet.
Figure 4:
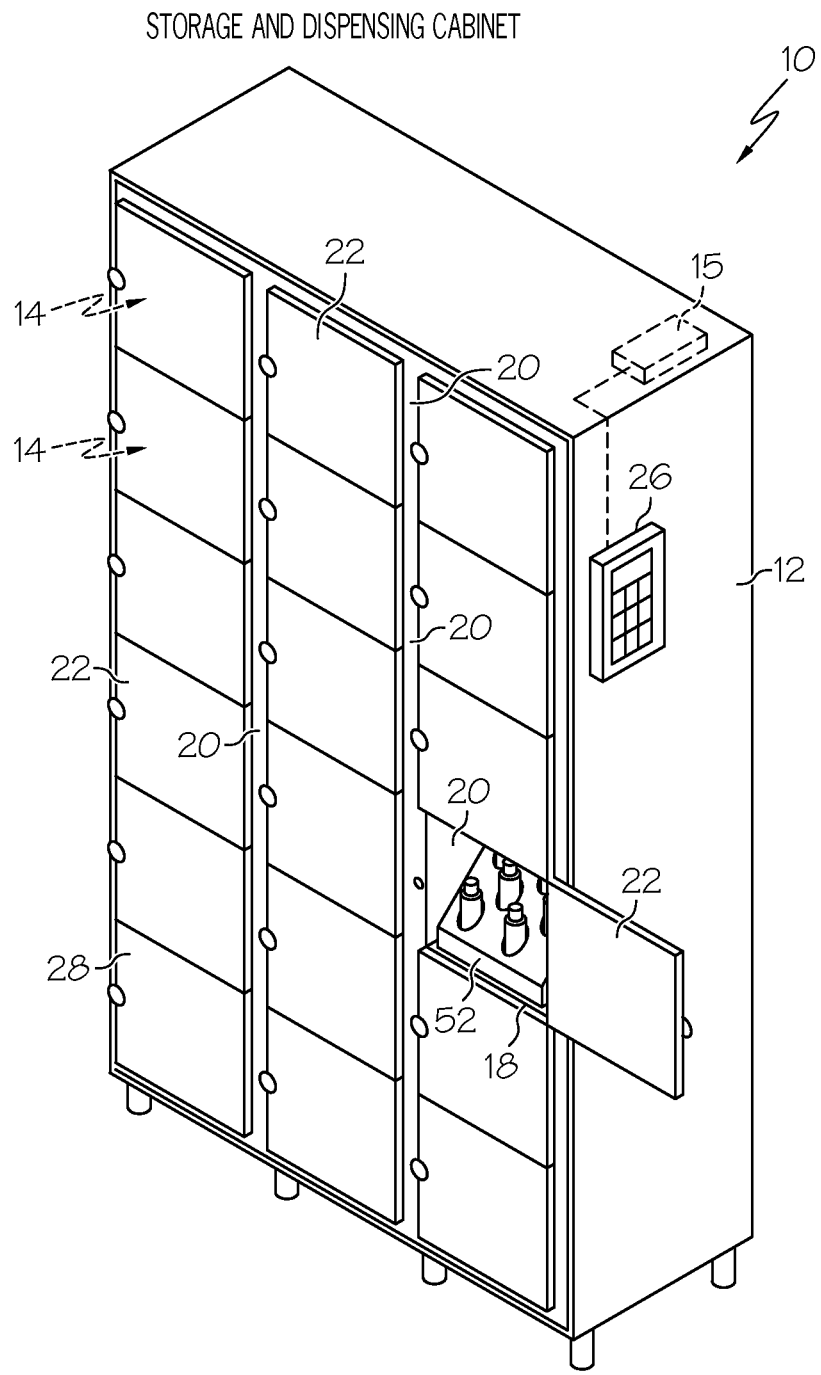
FIG. 4 is a front perspective view of yet another alternate storage and dispensing cabinet.

FIG. 2 illustrates an alternate embodiment in which the storage cabinet 12 includes a plurality of shelves 18 and dividers 20 (but no drawers 24), and the shelves 18 can be accessed by opening a single large, lockable cabinet door 22. FIG. 3 illustrates another embodiment similar to that of FIG. 2 except the storage cabinet 12 includes two outwardly-pivoting, lockable doors 22 to cover the compartments 14 and control access thereto. The single-door cabinet 12 of FIG. 2 may be easier and more inexpensive to manufacture, while the dual-door cabinet 12 of FIG. 3 may be preferable in certain cases when space around the cabinet 12 is limited and/or adjacent components may prevent full opening of a larger single door 22. FIG. 4 illustrates yet another embodiment in which the storage cabinet 12 includes a plurality of generally equally-sized compartments 14 defined by shelves 18 and vertical dividers 20. Each compartment 14 may have an associated door 22 to control access thereto such that the storage cabinet 12 of FIG. 4 presents a locker-like configuration.

FIGS. 1-4 provide examples of various storage components/storage cabinets in various configurations. However, it should be understood that the shelves 18, vertical dividers 20, drawers 24, etc. of each storage cabinet 12 may be adjustable to allow the storage cabinets 12 to be customized for use with various-sized items 16. In addition, the storage cabinets 12 can come in a wide variety of shapes and configurations besides those specifically shown in FIGS. 1-4, and can include compartments 14 of various shapes and configurations accessible by various means such as doors 20, drawers 24, sliding panels, flip tops, and the like.

Each storage component/storage cabinet 12 can be configured to selectively control access to all or certain of its compartments 14 by allowing selective opening of the doors 20, drawers 24, and other similar components. In particular, each storage cabinet 12 may have or be associated with a controller 15 which a user can interact with to gain access to all or certain of the compartments 14 of the storage cabinet 12. The controller 15 may include or take the form of a processor, CPU, computer or the like, and may include a user interface 26 in the form of a keypad, touch screen, keyboard, mouse, track ball, audio input device, receiver or the like.

The controller 15 (and its user interface 26) can be integrated with and/or attached to the associated storage cabinet 12, as shown in FIGS. 1-4, or can be separate and stand alone. FIGS. 1-3 illustrate a user interface 26 in the form of a keypad mounted on a door 20, and FIG. 4 illustrates a user interface 26 in the form of a keypad mounted on the side of the storage cabinet 12. However, the user interface 26 can be located at any of a wide variety of positions. Each storage cabinet 12 can have its own controller 15 and/or user interface 26, or multiple storage cabinets 12 may share the same controller 15/user interface 26. Alternately, in some cases, the controller 15 and/or user interface 26 may be omitted from the storage cabinet 12.

When a user wishes to access and withdraw an item 16 from a storage component/storage cabinet 12, or replace/replenish items 16, the user may need to first be identified and/or authenticated. The identification/authentication steps can be carried out in a variety of manners and with various types of equipment, such as an identification system that may include or incorporate the controller 15 and user interface 26, or other components/equipment as described below. In one case, each user has a user identification and/or password, which may be unique to that user (or to a particular class of users). When prompted, the user can input the user ID and/or password into the user interface 26.

In another case, the system 10 can identify and/or authenticate the user by a key fob or other wireless device, that is carried by the user, which transmits in the radio frequency or at other frequencies. The controller 15/user interface 26 can incorporate a reader that can recognize the unique signal transmitted by the key fob to identify/authenticate the user. In this case, a user may be automatically identified as he or she approaches the physical location of a storage cabinet 12. Alternately, users can be authenticated through remote messaging to the controller 15 from an independent device or network, such as a smart phone, cell phone, mobile phone or device carried by the user, via a text message, a sms message or the like. The user can also be identified and/or authenticated by any of a wide variety of other means or mechanisms, including by the use of a mechanical or electronic key, by swiping a card with a magnetic stripe, through the use of biometrics (including facial recognition), or combinations thereof.

Once the user is identified by the identification system, the controller 15 may reference an authorization database included in and/or operatively coupled to the controller 15 and/or identification system. The authorization database identifies which of the plurality of items 16 a particular identified user is authorized to access. In one case, the authentication database resides at the controller 15. In another embodiment, the authentication database resides at a remote device, as the remote server 17 shown in FIG. 1. The authentication database identifies which compartments 14 and/or items 16 the user is authorized to access, as determined by an administrator.

In some cases, an identification of the compartments 14 and/or items 16 which the user is authorized to access may be displayed to the user. For example, the authorized compartments 14, dispensers and/or items 16 may be displayed on the user interface 26 and/or, in some cases, the compartments 14, dispenser and/or items 16 may be directly identified, such as by activating lights associated with particular compartments 14/dispensers/items 16, etc. In some cases, the doors 22 of the storage cabinet 12, which provide access to authorized compartments 14/items 16 for that user, may unlock and/or open automatically when the user is identified and/or authenticated. In other cases, however, the user interface 26/cabinet 12 does not necessarily display or identify which compartments 14 and/or items 16 the user is authorized to access.

After the user's access rights have been authenticated, but before the user is granted access to the desired compartment(s) 14, the controller 15 may check the inventory levels of each item 16 in the dispensers and/or storage component(s)/cabinet(s) 12. As described in greater detail below, after the transaction is completed, or during dispensing, the controller 15 may update inventory levels by adjusting for any items 16 taken, removed or added during a transaction/session. In this manner, the number of items 16 taken, removed or added can be tracked based upon a transactional basis.

Rather than being used strictly for dispensing and replenishment, the system 10 may be used to loan out items 16 for use. For example, the item 16 may take the form of equipment, instruments, hand tools, power tools or the like which can be used multiple times. In some cases, the cabinet 12 may have a power source/plug or the like in the associated dispenser/compartment 14 such that the item 16 can be recharged when the item 16 is stored in its compartment 14. In this case, when a user returns a loaned item to the cabinet 12, the amount of time that the item 16 was checked out, along with the identification of the user, may be tracked.

The system 10 may also identify a "loan period" for items 16 removed or checked-out from the cabinet 12. In this case, then, when the item 16 is not returned within the loan period, the event could be recorded and an alert could be sent to the user and/or the system administrator in the form of an email, text/sms message, etc. The system 10 may also provide time-based limits upon the access to certain items 16. For example, if the system 10 determines that a rechargeable tool was checked out for a certain period of time, after the tool is returned the system 10 may subsequently prevent users from accessing that item for a related amount of time to allow time for the tool to properly recharge.

FIGS. 1-4 illustrate cases in which the user has been granted access to the compartments 14 by the opened doors 22/drawer 24 which exposes the compartments/dispensers/storage components 14 therein and provides the user access to the items 16 stored therein. The user may then be able to access and retrieve (or replenish) an item 16 stored in the associated storage compartment 14. As described in greater detail below, the storage components/dispensers/compartments 14/storage cabinet 12 may include and incorporate a sensor system in the form of various sensors so that the identity and number of the items 16 removed or added by the user can be tracked. In some cases, each item 16 is associated with one or more sensors so that each item 16 removed from or added to the storage cabinet 12 can be tracked. In other cases, each type of item 16 is associated with one or more sensors. In yet other cases, a single sensor can track dispensing of various items or various types of items.

After the user has accessed the desired compartments 14 and retrieved, replaced or replenished the desired items 16, the associated doors 22/drawers 24 and the like may be closed, either by the user or automatically. The storage cabinet 12 may then lock the associated doors/drawers such that no further access is allowed, at least to those associated compartments 14, until the same or a different user goes through the identification/authorization process.

During a dispensing or return transaction, the user's dispensing/return/access behaviors may be monitored and/or controlled/limited, in some cases, to limit the user's access to only authorized items 16, according to the authorization database. If an unauthorized transaction occurs (or is attempted), the system 10 may note the occurrence and possibly send a notification to a system administrator, and in some other cases, a siren, buzzer or surveillance camera, which can be part of the system 10, and may be activated.

As noted above, each compartment 14 may have a sensor and/or dispenser positioned therein to track the dispensing/removal of items. FIGS. 5-19 illustrate various dispensers/storage components that can be used in a compartment 14, or otherwise used as or in association with another storage component, to dispense and/or track items 16, although it should be understood that various other types of dispensers/storage components can also be used. Each dispenser, and/or its associated sensors/sensor system, may be operatively coupled to the controller 15 so that dispensing/return/access activities, and inventory levels, can be tracked, or may be coupled to its own controller, as will be described in greater detail below. The cabinets 12, dispensers, compartments 14 and/or shelves 18 can each be considered a storage component configured to store a plurality of items therein or thereon in an associated storage position, wherein the storage component is configured to provide a user direct manual access to the items in their storage position.

Figure 5:
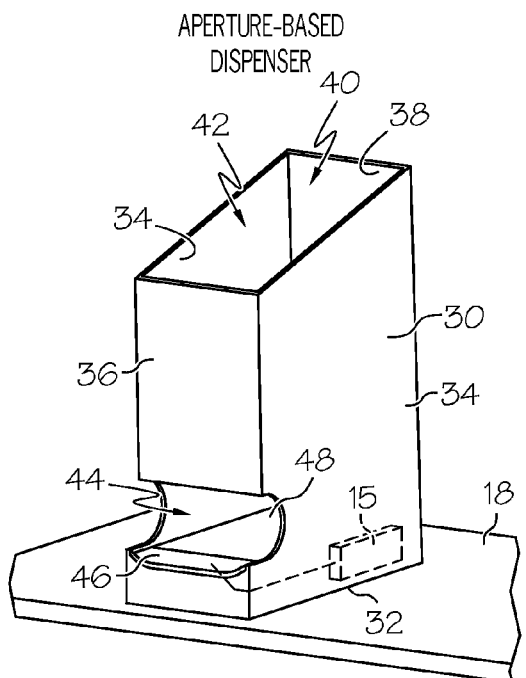
FIG. 5 is a front perspective view of empty aperture-based dispenser, shown in its empty condition.

FIG. 5 illustrates an aperture-based dispenser 30 in the form of a generally rectangular prism or outer casing having a base 32 and a pair of parallel, vertically-extending sidewalls 34. The aperture-based dispenser 30 also includes a vertically-extending front wall 36 and rear wall 38 that is parallel to, but spaced apart from, the front wall 36.

Figure 6:
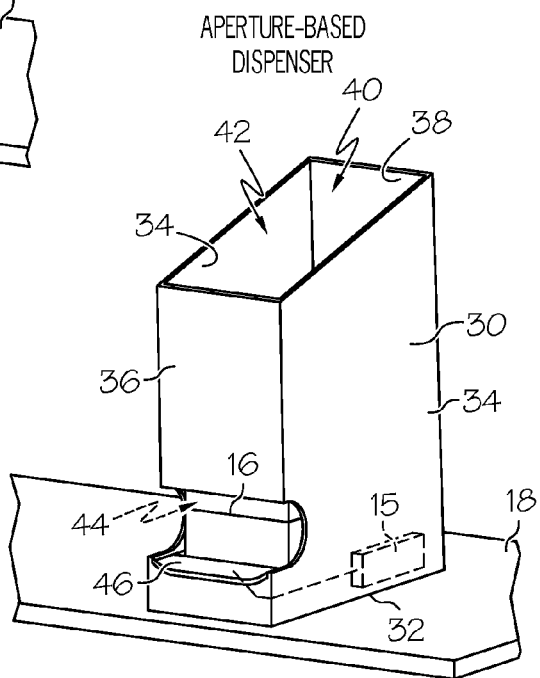
FIG. 6 is a front perspective view of the aperture-based dispenser of FIG. 5, with an item positioned therein.

Each of the walls 34, 36, 38 extend upwardly from the base 32 and define a central cavity 40 therebetween. The side walls 34 may be spaced apart a distance slightly greater than the length of the items 16 to be stored therein (FIG. 6). The dispenser 30 has an open top 42 and an opening, or aperture 44, formed at or near the bottom of the front wall 36. The open top 42 and aperture 44 both communicate with the central cavity 40. The aperture 44 is sized to allow only a single item 16 to pass therethrough at a time. A presence sensor 46 is positioned in, at, or adjacent to the aperture 44 such that the sensor 46 can detect the presence and/or absence of an item 16 in or adjacent to the aperture 44.

When an item 16 or plurality of items 16 are positioned in the dispenser 30, as shown in FIG. 6, the items 16 can be extracted from the dispenser 30, through the aperture 44, one at a time. The bottom surface 48 of the aperture-based dispenser may be inclined forwardly to cause each item 16 to slide or roll forwardly into (but not through) the aperture 44 to replace the removed item 16. The presence sensor 46 is triggered each time an item 16 is removed from the dispenser 30 such that the number of items 16 retracted from the dispenser 30 can be tracked. In other words, when a user removes an item 16 from the dispenser 30, in one case the presence sensor 46 quickly toggles between the off and on position, thereby capturing the transaction.

The presence sensor 46 can take any wide variety of forms. In one case, the presence sensor 46 is an electrical switch which is a spring biased in the open position. When an item 16 is positioned in or removed from the aperture 44, the weight of the item, and/or extraction force, pivots or presses a portion of the switch 46 downwardly, making electrical contact and completing the circuit such that the presence sensor 46 detects the presence of the item 16 in the aperture 44. However, the presence sensor 46 can take any of a wide variety of forms, including but not limited to pressure or force sensors, weight sensors, optical or line-of-sight sensors, detectors based on mechanical forces, membrane switches/sensors, magnetic switches/sensors, light or electromagnetic radiation (visible, infrared or otherwise) sensors, contact sensors, photoelectric sensors, ultrasonic sensors, piezoelectric sensors, piezoresistive sensors, accelerometers, motion sensors, tilt sensors, proximity sensors, electric field sensors and other on-off sensing means.

In one case, the dispenser 30 is configured to dispense only items 16 of a single type. However, the shape and configuration of the aperture-based dispenser 30 can be varied as desired to accommodate various differently sized and shaped items 16. In addition, the open top 42 of the aperture-based dispenser 30 provides a relatively large opening that can be used for refill/replenishment such that a number of items 16 can be quickly loaded into the dispenser 30. The open top 42 of the dispenser 30 may be securely covered by a cap or the like (not shown) other than during dispensing operations to ensure that items 16 are removed by a user only through the aperture 44. In some cases, a sensor may be positioned at or adjacent to the open top 42 such that the number of items 16 added during replenishment can be tracked. In addition, the dispenser 30 may be configured to receive a stack of items 16 therein to ensure a first-in, first-out dispensing order.

Figure 7:
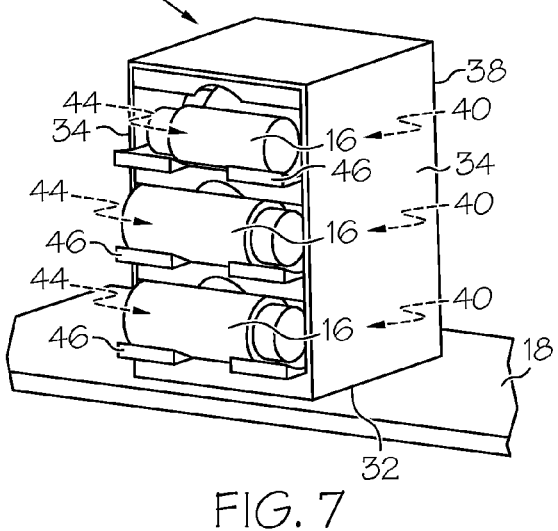
FIG. 7 is a front perspective view of another aperture-based dispenser.

FIG. 7 illustrates another embodiment in which the aperture-based dispenser 30 includes a number of discrete central cavities 40, each central cavity 40 having an associated aperture 44 and presence sensor 46 such that the apertures 44 are stacked vertically in the dispenser 30. In this case, the dispenser 30 shown in FIG. 7 may be utilized to store and dispense a number of different items 16 (i.e. differing colors of spray paint cans, in the illustrated embodiment), with one type of item 16 being positioned in each discrete central cavity 40.

Figure 8:
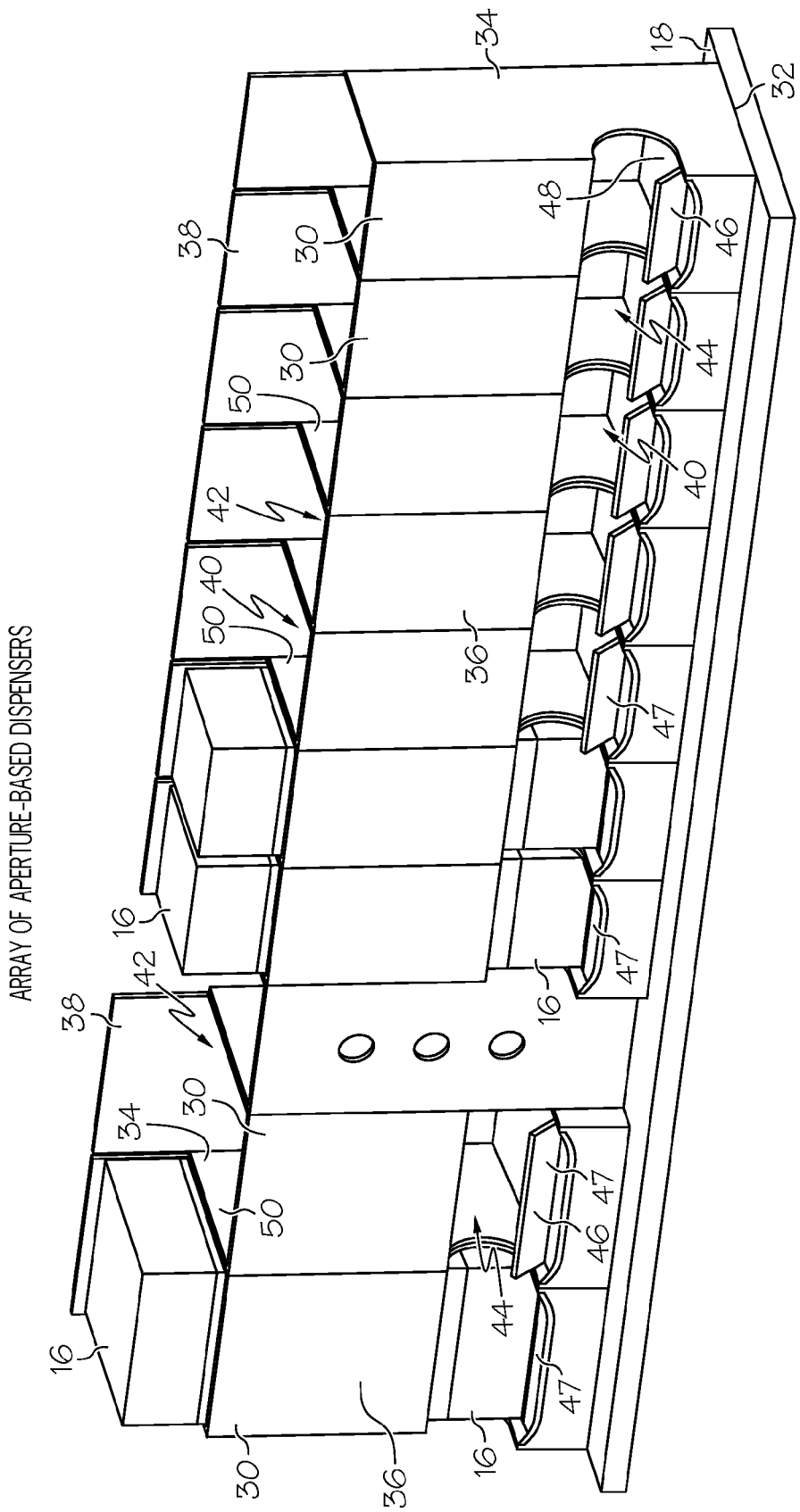
FIG. 8 is a front perspective view an array of aperture-based dispensers.

As shown in FIG. 8, the storage cabinet 12 may include or utilize an array of side-by-side aperture-based dispensers 30, with each dispenser 30 having a presence sensor 46 to track the removal/dispensing of items 16 therefrom. In this case the presence sensor 46 take the form of a flap 47 which is spring biased to an angle, and pressed flat when an item 16 is positioned in and/or passed through the aperture 44. In some cases, the dividers 50 between adjacent aperture-based dispensers 30 can be adjusted (i.e. in the left-to-right direction of FIG. 8) to customize the size of each aperture-based dispenser 30 for use with a particularly sized item 16. In this case more than one flap 47 can be used to detect the presence/dispensing of an item 16, for sufficiently large items 16.

Figure 9:
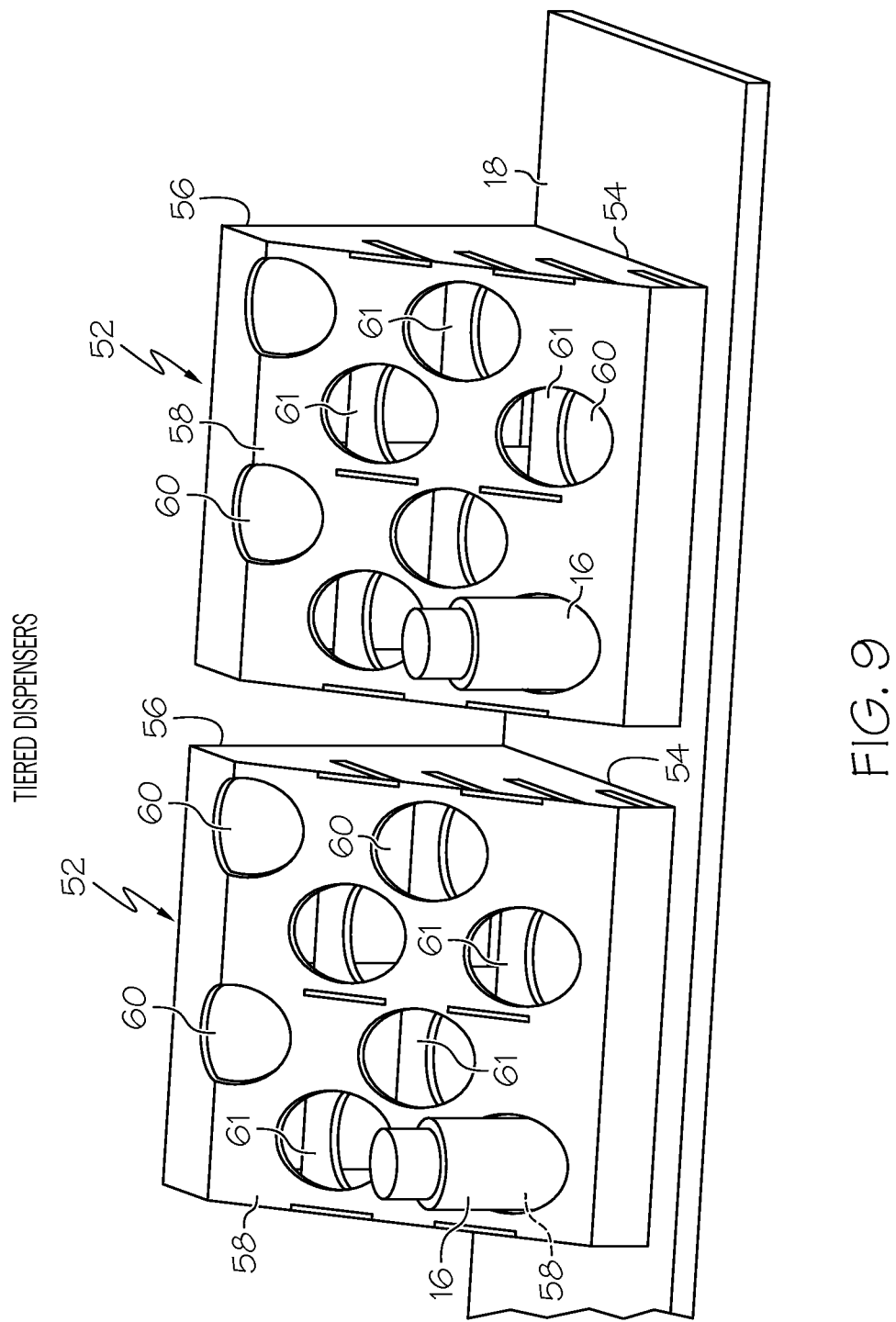
FIG. 9 is a front perspective view of a pair of tiered dispensers.
Figure 10:
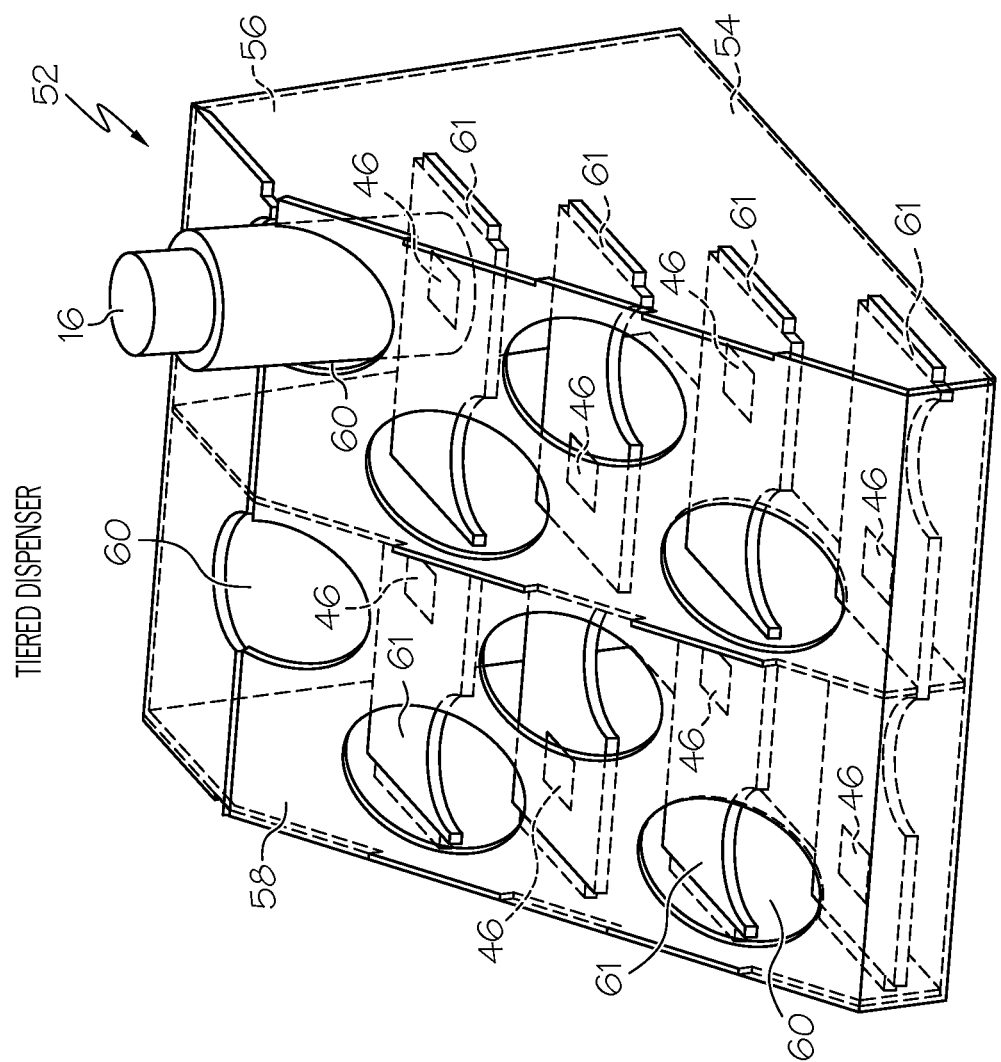
FIG. 10 is a front perspective view of a tiered dispenser of FIG. 9, showing the internal shelves thereof.

FIGS. 9 and 10 illustrate another dispenser in the form of a tiered dispenser 52. As can be seen, the tiered dispenser 52 is generally triangular in cross section and includes a generally horizontally-extending base 54, a generally vertically-extending back panel 56, and an angled panel 58 extending generally between the base 54 and the back panel 56 of the tiered dispenser 52. The angled panel 58 includes a plurality of cutouts 60 formed therein to provide a "swiss cheese" appearance to the dispenser 52. In the illustrated embodiment, each cutout 60 is generally circular in top view to enable the tiered dispenser 52 to receive a plurality of generally cylindrical items 16 therein. However, the cutouts 60 can have various other shapes to correspond with the shape of the item 16 being stored therein.

The tiered display 52 may be configured such that each item 16 received therein rests on, adjacent to, or is otherwise associated with a presence sensor 46 so that the presence or absence of the item 16 can be detected. The presence sensors 46 for the tiered dispenser 52 can take any of a variety of forms, such as those outlined above in the context of the aperture-based dispenser 30.

The tiered dispenser 52 may have a plurality of internal shelves 61 positioned therein. The shelves 61 may be tiered such that the shelves 61 positioned closer to the back panel 56 are positioned higher than those further from the back panel 56. In this case, when items 16 are passed through an associated cutout 60 and sit on an internal shelf 61, items 16 toward the rear of the tiered dispenser 52 are raised higher than those in front to increase the visibility of the items 16 stored therein, increasing visibility and ease of access.

Figure 11:
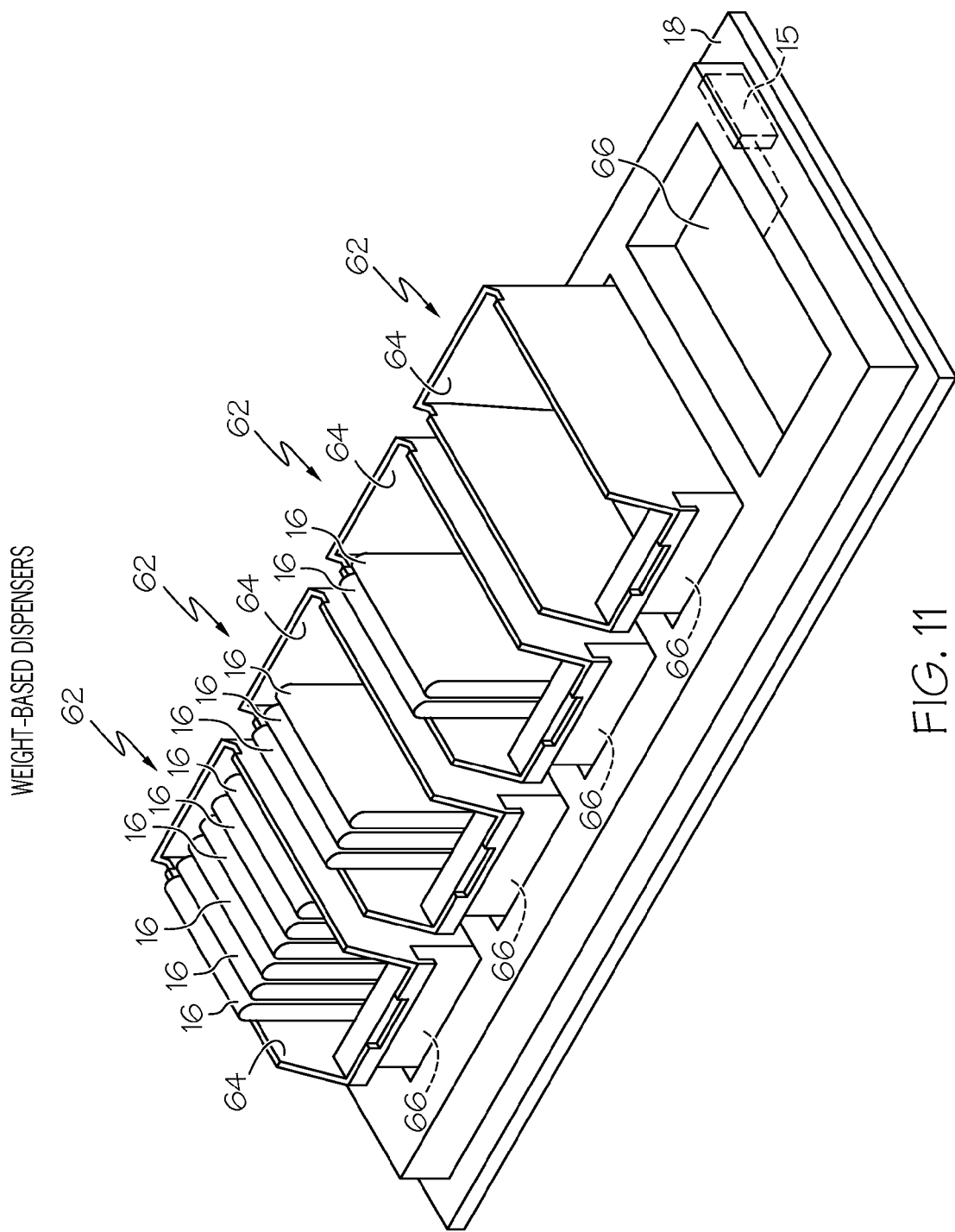
FIG. 11 is a front perspective view of a plurality of weight-based dispensers.

FIG. 11 illustrates another type of dispenser, in the form of a weight-based dispenser 62. Each weight-based dispenser 62 may take the form of a bin, box or other storage component 64 which receives a plurality of items 16 therein. Each storage component 64 may be configured with an open top and/or front to provide high visibility of its contents to the user. Each storage component 64 may incorporate or rest upon a weight sensor 66 operatively coupled to the controller 15 such that the weight sensor 66/controller 15 can determine when items 16 have been removed from or added to the associated storage component 64. The weight-based sensor 66 may take the form of load cells, scales, pressure transducers or the like.

Each weight-based dispenser 62 may operate by taking measurements before and after a tracked dispense operation. The difference in weight can then converted into a corresponding quantity of items 16 for that particular dispenser 62. The weight-based sensors 66 may have weight-per-unit data stored therein or accessible thereby (i.e. stored in the controller 15 or elsewhere). Alternately, the weight-based sensors 66, or the controller 15 or other components may be able to be programmed or calibrated in the field to determine weight-per-unit data.

Each weight-based dispenser 62 may also be able to be used to track bulk materials, such as liquids, powders, lubricants and bulk/small components. The weight-based dispensers 62 therefore enable great flexibility for the storage cabinet 12 to accommodate a wide range of items having varying sizes and packages, ranging from regular items with a fixed and quantifiable unit weight to bulk materials (such as fluid, powders, granular components, or other small items) which are otherwise difficult to track.

The weight-based dispenser 62 can also be useful for items that are loaned out and/or partially consumed during use. For example, if the system 10 allows an item 16 in the form of nail gun to be dispensed/loaned out, the difference in weight in the nail gun before and after its use can be tracked to determine the number of nails that were used/consumed. The weight-based dispenser 62 is also useful during replenishment or restocking, as the restocker can simply place the appropriate items 16 into the corresponding storage component 62, and the system 10/controller can automatically calculate the inventory count based on the added weight.

Figure 12:
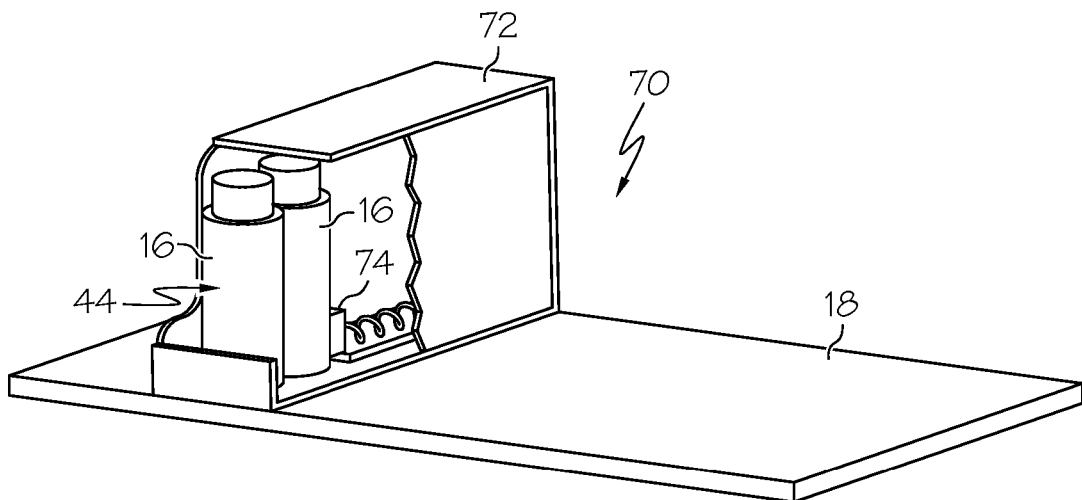
FIG. 12 is a front perspective cut-away view of a distance-based dispenser with two items positioned therein.
Figure 13:
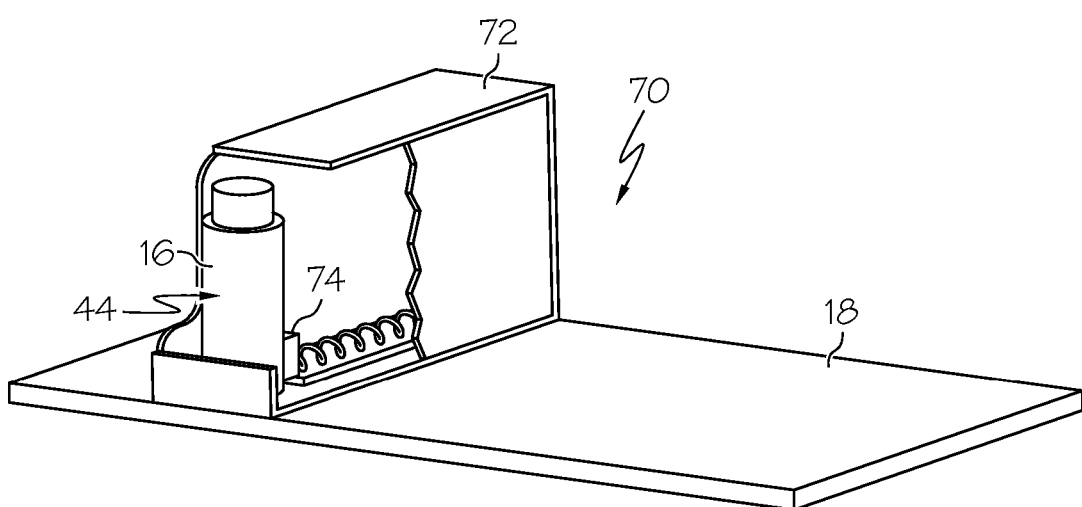
FIG. 13 is a front perspective view of the distance-based dispenser of FIG. 12, after an item has been removed therefrom.

FIGS. 12 and 13 illustrate another type of dispenser in the form of a distance-based dispenser 70. The distance-based dispenser 70 includes a body 72 generally in the form of a rectangular prism with a biased or spring-loaded pusher bar 74 positioned therein. The spring-loaded pusher bar 74 pushes the items 16 in the distance-based dispenser 70 towards a forward or dispensing position or aperture. In this manner, when an item 16 is removed by a user (as can be seen in comparing FIGS. 12 and 13), the pusher bar 74 indexes the remaining item(s) 16 forwardly. The position of the pusher arm 74 is then tracked such that the number of items stored/dispensed/replenished can be tracked.

Various sensors or mechanisms may be utilized to track the position of the pusher arm 74, including use of the sensors as described above in the context of the aperture-based dispenser 30. In one embodiment, however, an infrared beam may be reflected off of the pusher bar 74 to determine the position of the pusher bar 74, and therefore the number of items 16 stored therein/dispensed. The distance-based sensor may also or instead take the form of mechanical or optical encoders, light or ultrasonic sensors, potentiometers, or mechanical linkages. The distance-based dispenser 70 shown in FIGS. 12 and 13 is generally horizontally oriented such that the pusher bar 74 moves generally horizontally. However, the distance-based dispenser 70 can be oriented in a variety of other configurations, such as angled or vertically.

As can be seen in FIGS. 12 and 13, the distance-based dispenser 70 is useful for dispensing items 16 with fixed dimensions. However, the same or similar concepts can be applied to dispensing bulk products. For example, the pusher bar 74 may be oriented generally vertically in a storage container 72 from which items 16 are dispensed, and the pusher bar 74 rests upon the top surface of the mass of bulk items. As items 16 are dispensed from the storage container 72, the volume in the storage container 72 is reduced and the pusher bar 74 moves downwardly a corresponding amount.

The distance-based dispenser 70 may also be used in this case in conjunction with irregularly-sized storage components 72. In particular, the size and shape of the storage component 72 can be programmed into the controller 15 so that the controller 15 can determine the number/amount of dispensed items from the position of the pusher arm 74. Such sensors can thereby provide information relating to the amount or volume of units dispensed, and can convert such measurements into the number of units dispensed.

Figure 14:
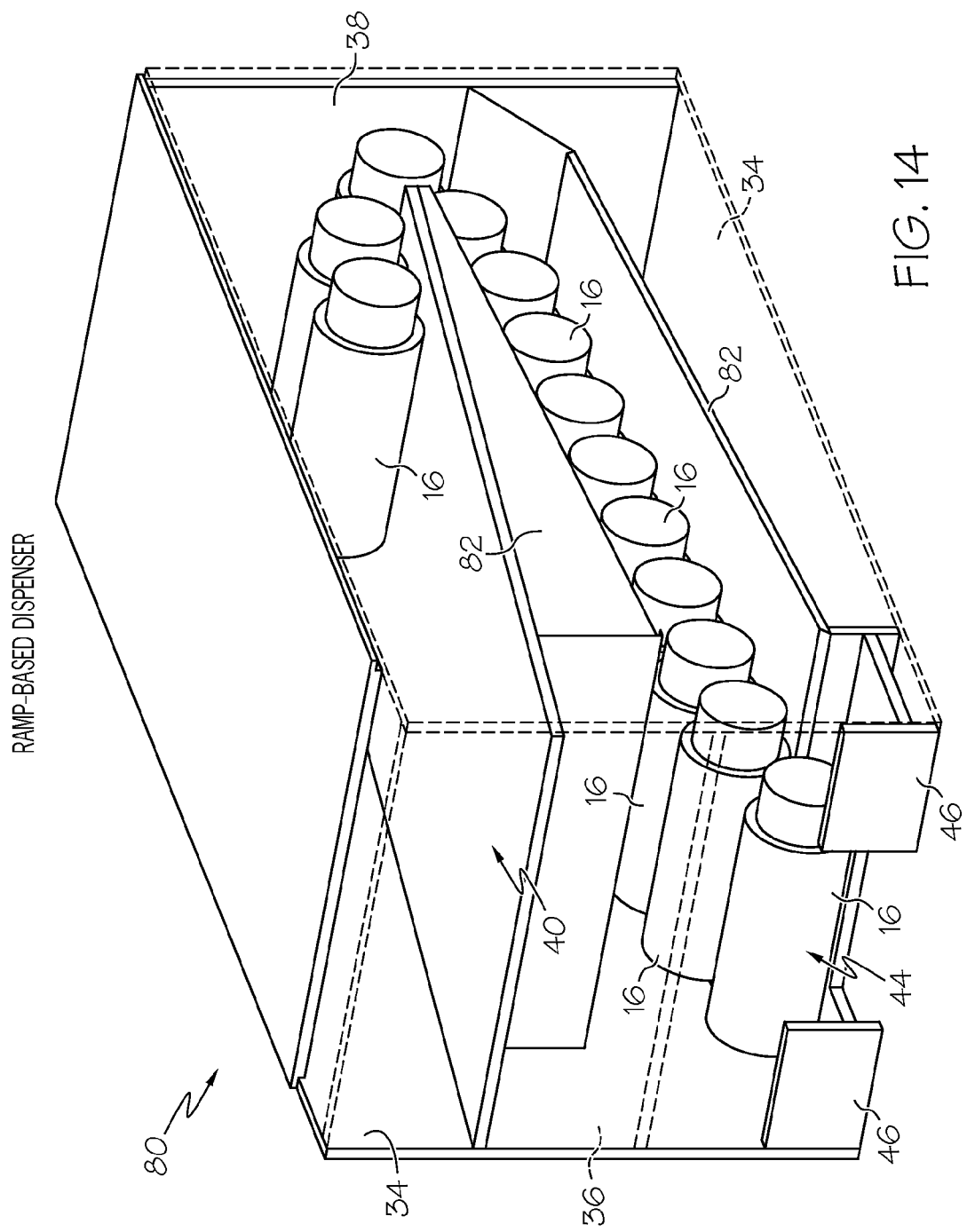
FIG. 14 is a front perspective view of a ramp-style dispenser.

FIG. 14 illustrates another dispenser in the form of a ramp-style dispenser 80. The ramp-style dispenser 80 is somewhat similar to the aperture-based dispenser 30 described above and shown in FIGS. 5 and 6 in that, for example, the ramp-style dispenser 80 includes an aperture 44 through which only a single item 16 can be passed at a time. The ramp-stype dispenser 80 includes a series of internal ramps 82 arranged in a serpentine manner upon which the items 16 roll or slide downwardly due to gravity. The ramp-style dispenser 80 thereby provides one-at-a-time dispensing, and also allows a user to see (at least to a degree) how many items remain in the dispenser 80 by glancing into the aperture 44.

The aperture-based dispenser 30, distance-based dispenser 70 and ramp-style dispenser 80 are designed, in the illustrated embodiments, to provide a first in-first out consumption order. In particular, those dispensers are designed so that the items 16 put into those dispensers earlier will be dispensed earlier, which can be beneficial for items 16 which have a limited shelf life. However, the dispensing order of those dispensers can be varied if desired.

Figure 15:
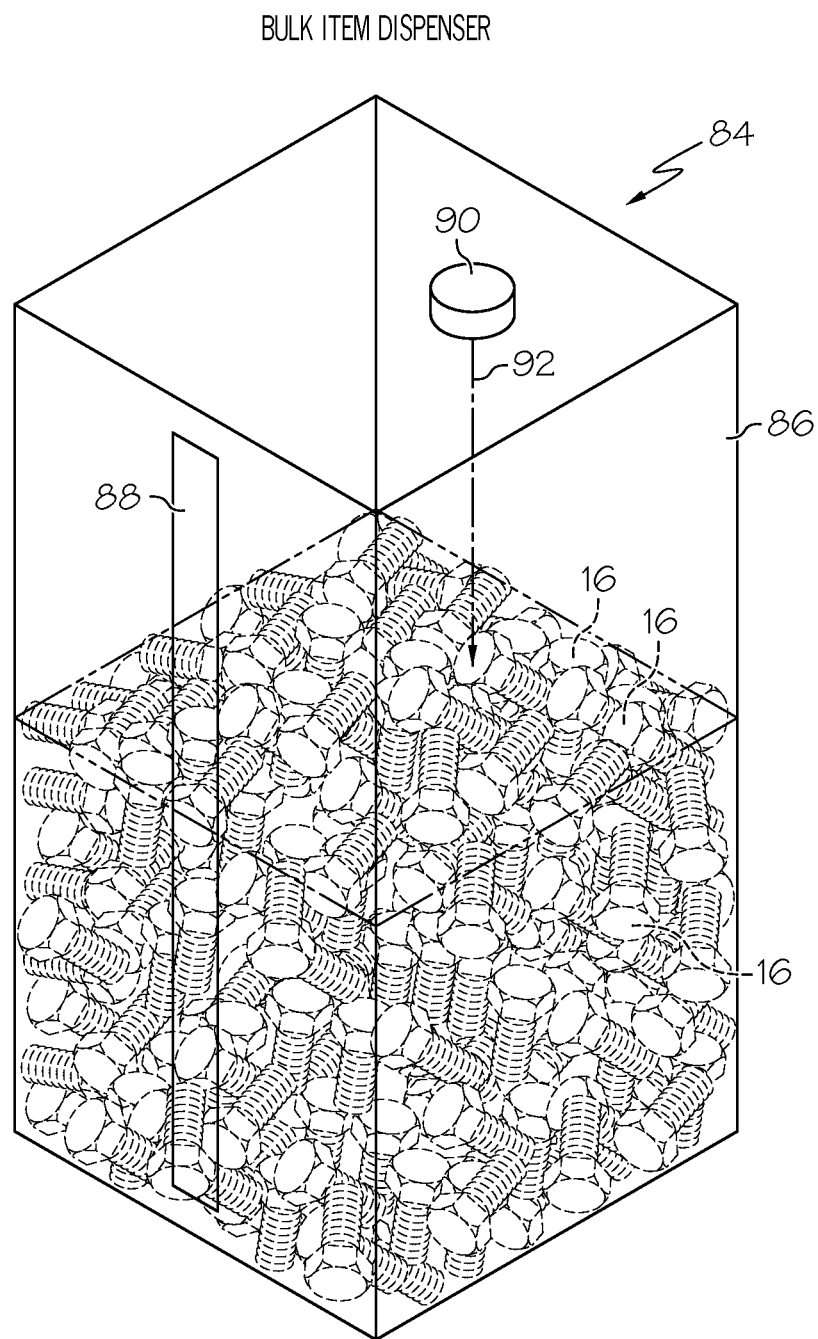
FIG. 15 is a front perspective view of a bulk item dispenser.

FIG. 15 illustrates a dispenser 84 for dispensing bulk items, such as liquids, powders, lubricants and bulk/small components (e.g. small bolts in the illustrated embodiment). The dispenser 84 includes a storage bin 86 with a level sensor 88 extending vertically along the height of the bin 86. The level sensor 88 can determine the height of the level of items 16 in the bin 86, and therefore estimate the amount of items in the bin 86. The level sensor 88 can detect such levels in a variety of manners, including electrical conductivity, by using a series of horizontally extending light beams, via presence sensors, or any of the other sensors/technology outlined above. The dispenser 84 can also, or instead, detect the top surface of items 16 in the bin 86 with a ultrasonic sensor 90 which directs an ultrasonic beam 92 toward the items 16 and tracks the time-of-travel of the reflection of the beam 92 to determine levels within the bin 86. Moreover, as noted above in the discussion of the distance-based sensor 70 of FIGS. 12 and 13, the pusher bar 74, or an analogous component, may also be used to detect the top surface of the items 16 in the bin 86.

Figure 16:
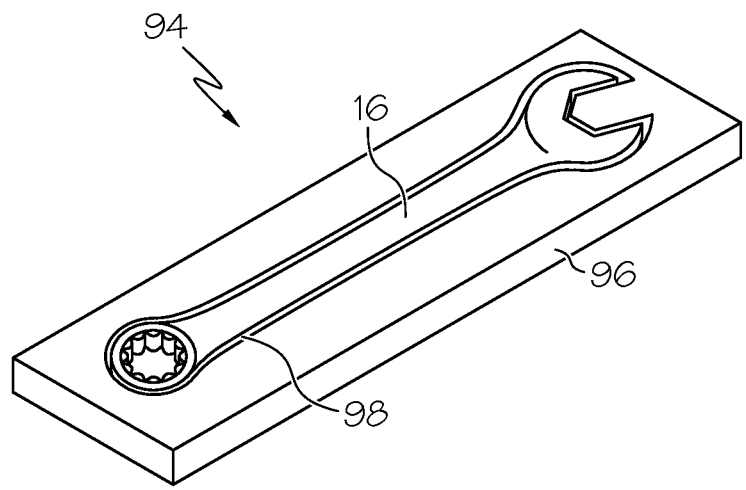
FIG. 16 is a front perspective view of a cut-out dispenser with an item positioned therein.
Figure 17:
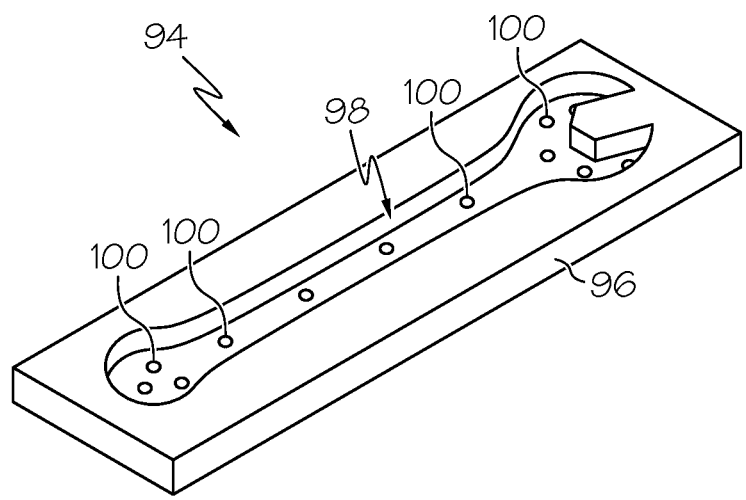
FIG. 17 is a front perspective view of the dispenser of FIG. 16, with the item removed.

FIGS. 16 and 17 illustrate another dispenser 94 in the form of a component 96 with a cut-out or recess 98 formed therein and configured to closely receive a particular item 16 therein. In particular, in FIGS. 16 and 17 the component 96 is generally flat and planar, and the cut-out 98 is configured to closely receive an item 16, in the form of a wrench, therein. As shown in FIG. 17, the component may include one or a plurality of sensors 100 in the cut-out 98, which can take the form of presence/absence sensors (including light, weight, magnetic or other sensors), but could take any of a variety of other forms.

The sensors 100 can thereby determine the presence/absence of the associated item 16 in the cut-out 98. The sensors 100 may be placed at strategic positions in the cut-out 98 to avoid false-positive readings. In particular, the sensors 100 may be positioned such that if another item (e.g. a smaller wrench) that happens to physically fit within the cut-out 98 were to be placed in the cut-out 98, then not all of the sensors 100 would be triggered. The system 10 can thereby determine that the desired item is not positioned in its appropriate location. The cut-out 98 may also be configured to minimize the number of other items 16 that can be received in the cut-out 98. Of course, various other cut-outs 98 sized and configured for various other items 16 can be located at other positions on the component 96, or on other components 96.

The cut-out dispenser 94 is useful since the item 16 is easily visible and directly and immediately manually accessible. In addition, when a user wishes to return the item 16, the user can easily determine the placement of the item 16 in its appropriate cut-out 98 due to the corresponding shapes.

Figure 18:
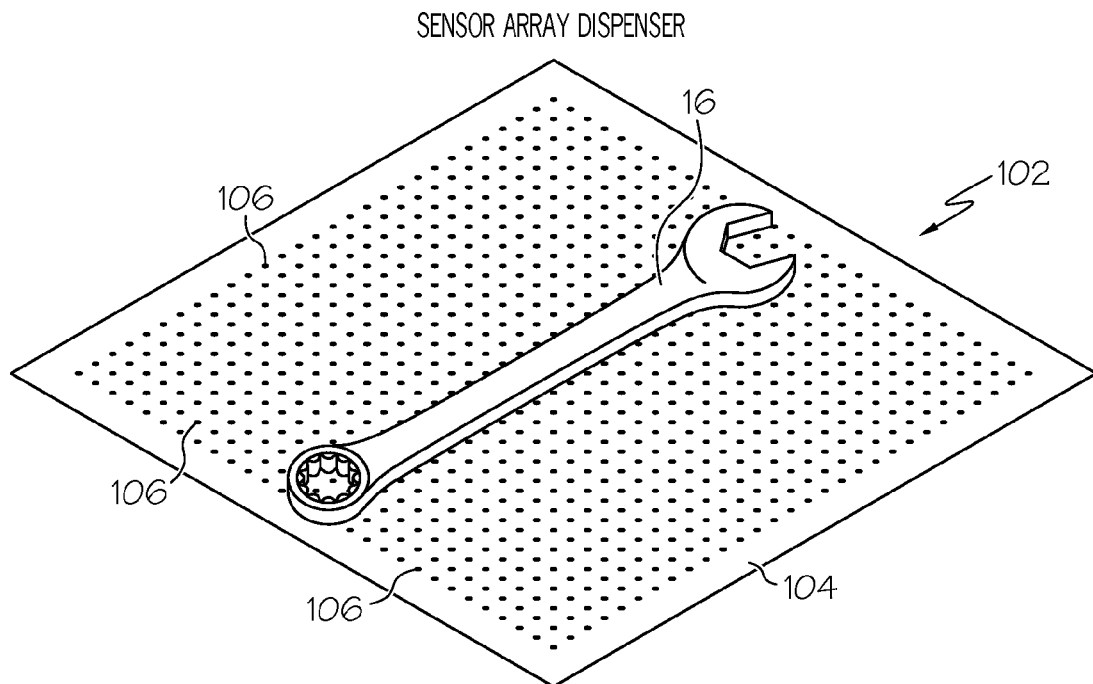
FIG. 18 is a front perspective view of sensor array dispenser, with an item positioned thereon.
Figure 19:
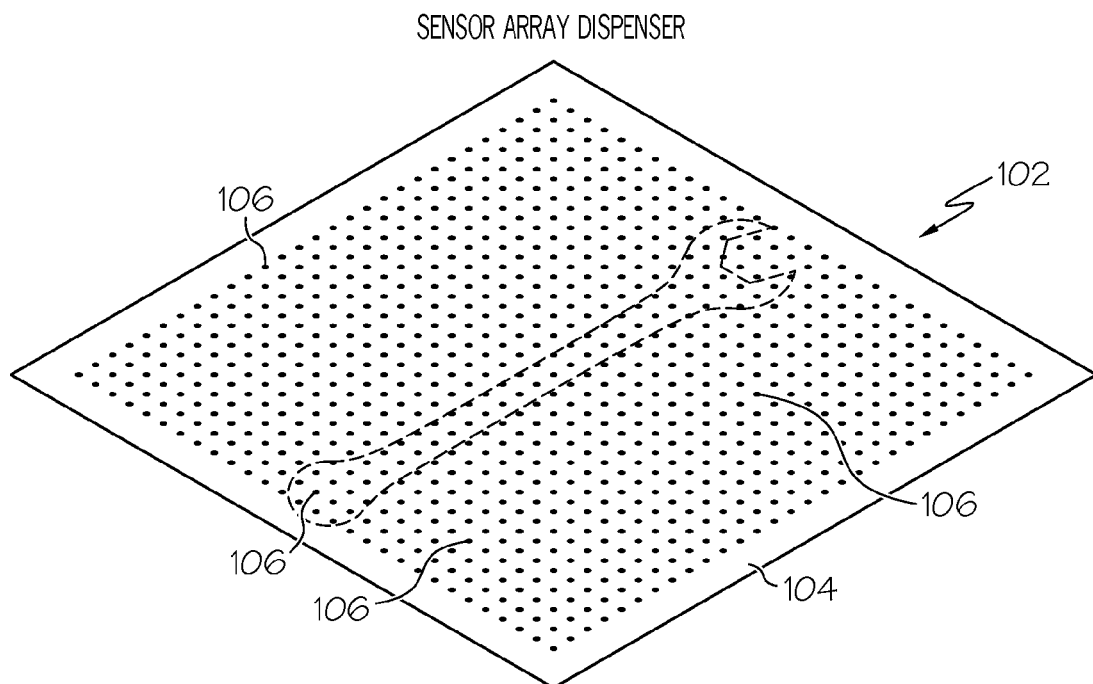
FIG. 19 is a front perspective view of the dispenser of FIG. 18, with the item removed.

FIGS. 18 and 19 illustrate a further alternate dispenser 102 which takes the form of a board 104 with a plurality of sensors 106 therein or thereon (which can, for example, take the form of the sensors 100 outlined above for the cut-out dispenser 94). When an item 16 (such as a wrench as shown in FIG. 18) is placed on the dispenser 102/board 104, the sensors 106 underneath the item 16 are triggered (or alternately, are not triggered, while the other sensors 106 are triggered). The outline/contour of the item 106 can thereby be compared to outlines/contours of items stored in the controller 15, and the item 106 is thereby identified. This type of sensor/dispenser 102 can be even easier to use than the dispenser of FIGS. 16 and 17, as the item 16 needs only to be placed anywhere on the board 104, and not in any particular location or orientation. Various other items 16 can also be placed on the same board 104 and their identities determined.

A further extension of the system of FIGS. 18 and 19 can be utilized in that, instead of utilizing presence/absence sensors, the board 104 may incorporate or utilize sensors that can map certain characteristics of the item 16, such as its shape, weight, surface characteristics, reflectivity, etc or combinations thereof. The measured characteristics can then be compared to those stored in a database so that the identity of the items 16, and any changed characteristics (i.e. the reduced weight of a nail gun that has dispensed a certain number of nails) can be determined. The system 10 can thereby use features similar to facial recognition software/algorithms. Such sensors could also be located at other positions on the system 10, and need not necessarily be positioned on a board 104.

The system 10 may also utilize dispensers/sensors in the form of "smart hook" dispensers (not shown), which includes a cantilevered hook, hanger, helical coil, or the like secured to the storage cabinet 12 at one end. A sensor is positioned at the free end of the hook and items 16 are hung on, and/or suspended from, the hook. Items can be removed from or added to the hook in the manner of a standard vending machine. When items are added to or removed from the hook, the sensor is tripped, thereby triggering an event count. Any of a wide variety of sensors, including the sensors described above in the context of the aperture-based sensor 30, may be utilized to track when an item is removed from the hook.

The system 10 may also utilize other sensor to track the activities of the user, such as imaging technology, including cameras, infrared cameras, video analytics, and motion tracking systems and software. The system 10 may also incorporate interrupt-beam technology, such as light beams which send an output when they are interrupted (i.e. when a user reaches into a compartment, shelf, dispenser or the like) so that the actions of the user can be tracked. These (and other) sensors may be not necessarily be limited to tracking a dispense activity and could instead, for example, track when a user reaches into, or extracts something from, a particular compartment 14, or a particular area/volume, and/or accesses, or attempts to access, a certain area, item, volume, or the like. The system 10 may also be able to track partial removal of an item 16 (which can still be considered "removal" of the item 16), such as when a user tears off a sheet from a roll of paper, such as by tracking the number of rotations of the roll.

Thus, as can be seen, various dispensers and storage components (including the dispensers 30, 52, 62, 70, 80, 84, 94, 102, the smart hook dispenser, and others) can be utilized for to track items 16 that are removed from or added to the associated compartments 14/storage cabinet 12. Of course, the various dispensers can be sized and/or adjusted as desired to accommodate various different items 16 of varying sizes and shapes, providing scalability to the system 10. Thus, a "dispenser" as used herein, which can also include or take the form of a storage component, can take the form of a more traditional dispenser in which various items are trapped within a closed volume. However, it should be understood that a dispenser/storage component could also take the form of a flat board (as in the dispensers of FIGS. 16-19), a compartment 14, or even a shelf or other surface upon which an item sits or is supported by.

The various sensors/dispensers disclosed herein can provide qualitative, non-binary information relating to the dispensing/use of items 16. Thus, such sensors may be termed "smart" sensors, compared to, for example, presence/absence sensors which may provide count information but not necessarily qualitative information. Moreover, it should be understood that two or more dispensers/sensors can be used in combination with certain items 16 to provide greater accuracy and redundancy in the tracking of dispensed items. In addition, it should be understood that any of a wide variety of other dispensers, with associated sensors for tracking the dispensing of items therefrom, can be utilized.

Figure 20:
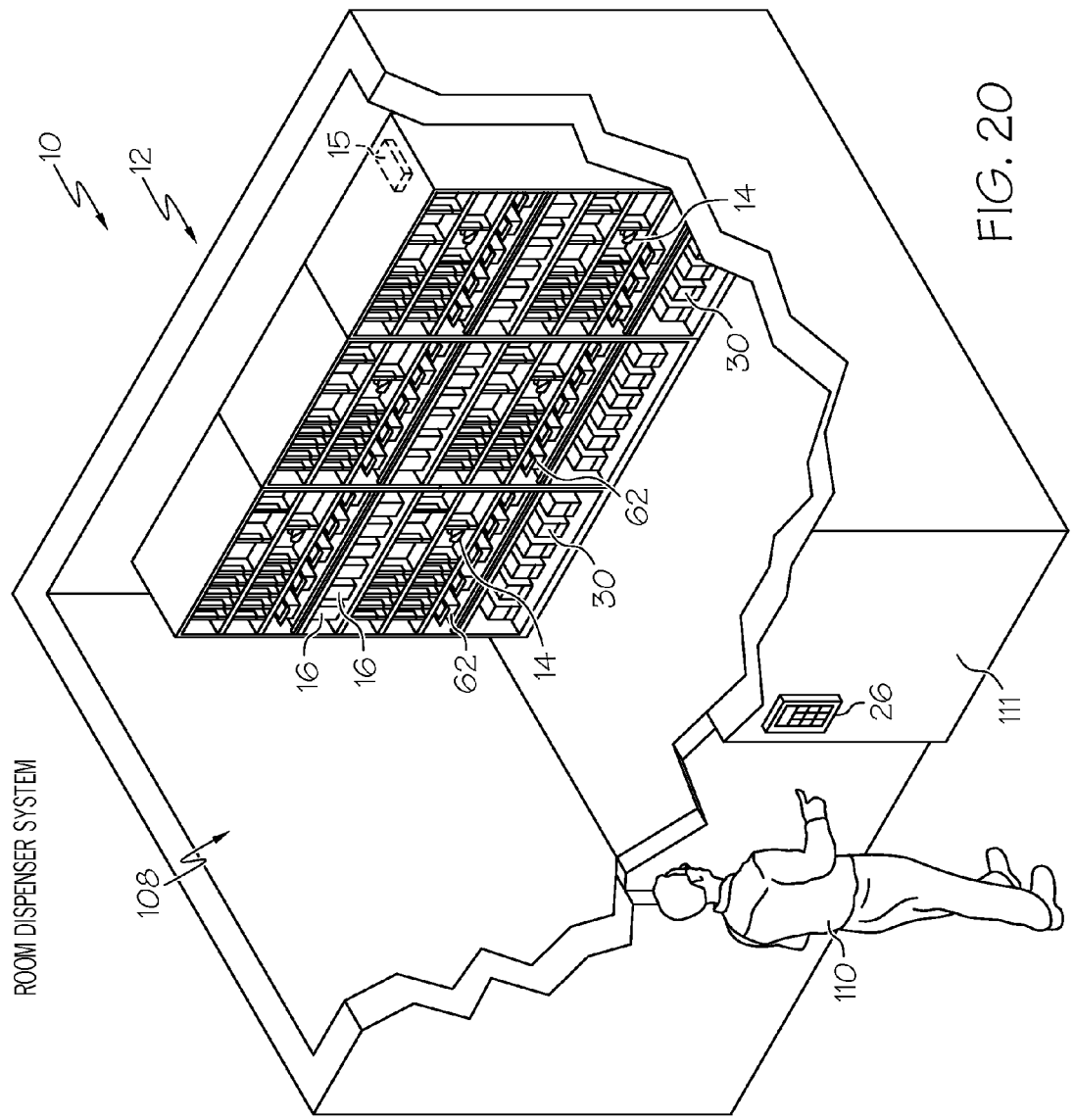
FIG. 20 is a front perspective, partial cutaway view of a room dispenser system.

In the embodiments shown in FIGS. 1-4, cabinet 12 may be locked/secured, and a user may be able to reach into the cabinet to manually access the desired items 16. However, if desired the system 10 can take the form of a walk-in "cabinet" 12, as shown in FIG. 20. In this case, the dispensers and sensors (including any and all of the dispensers and sensors described, shown and referenced above), with items 16 therein, are positioned within a generally closed/secured area or space 108, such as a room, closet, vehicle, shipping container or the like, with a door 111 to provide a person access therethrough and into the secure space 108. Each dispenser/item 16 is positioned within the room 108, and the user 110 may, in some cases, need to be identified/authenticated before the user 110 can enter the room 108. In the illustrated embodiment, the system 10 includes a keypad 26 to identify/authenticate the user 110, although any of the systems or methods outlined above for identification/authorization may be utilized.

Once the user 110 enters the room, the user can take and/or return item from the dispensers/shelves, and sensors track the removal and/or return of items. This system allows for greatly increased volume of storage capacity compared to the storage cabinets 12 shown in FIGS. 1-4.

Figure 21:
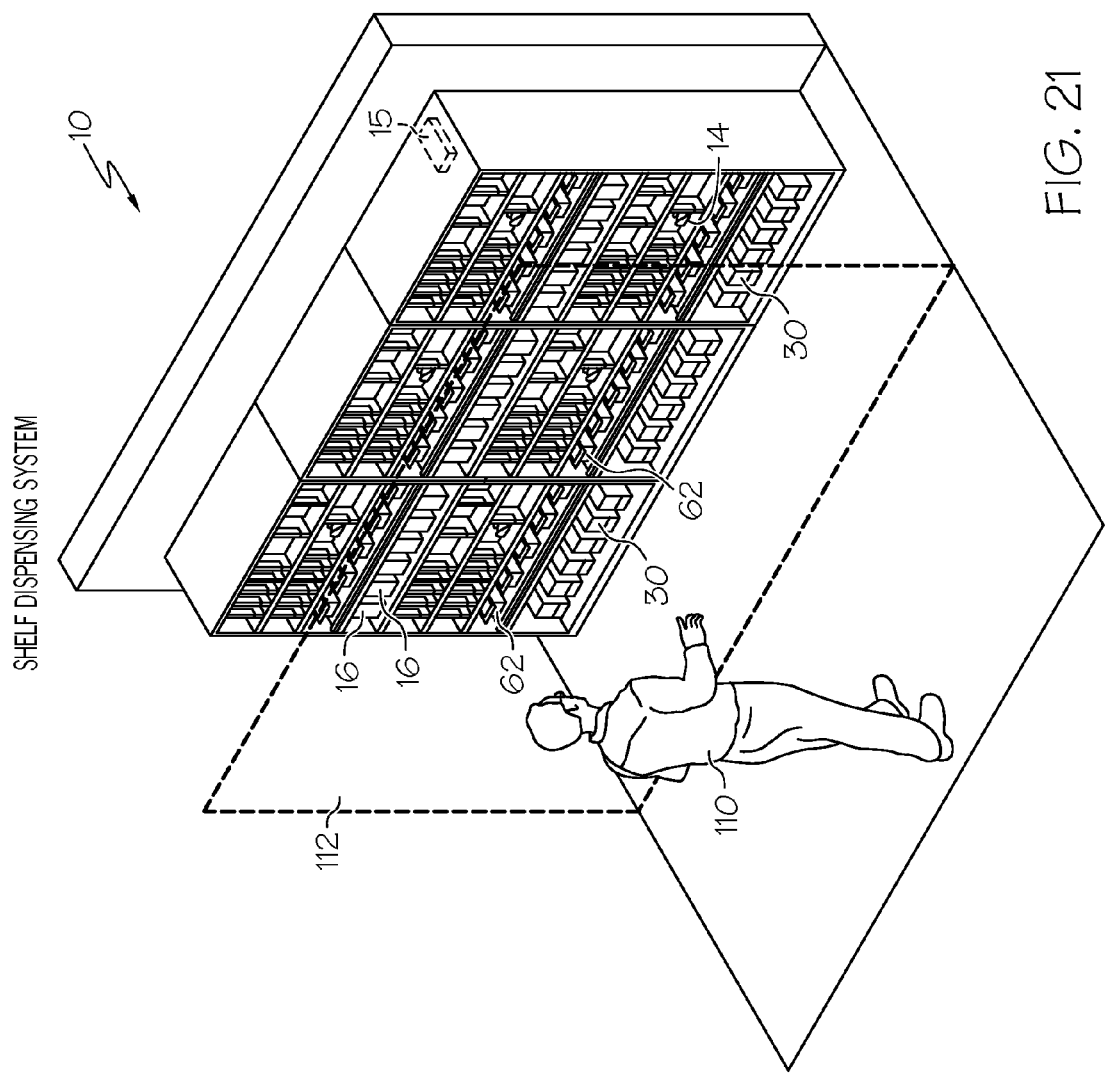
FIG. 21 is a front view of a shelf dispensing system with a virtual wall.

The system 10 can also even further remove physical barriers to the dispensers/items 16, as shown in the embodiment of FIG. 21. In this case the "cabinet" 12/system 10 may not include any physical barriers to the dispensers/items 16, and any user 110 may be able to simply walk up to the dispenser/items 16 stored on a shelf. In one case, a "virtual wall" 112 may be set up such that any individual 110 that crosses the virtual wall 112, or comes within sufficient proximity of the dispensers/items 16, is automatically identified and authenticated, or attempted to be identified and/or authenticated.

If the user 110 accesses, removes, attempts to access or remove items 16 for which the user is not authorized, the system 10 may sound an alarm, such as lights and/or sounds. The initial alarm may be more relative low level to provide initial warnings to the user 110, but may increase to higher levels should the unauthorized activity continue. The system 10 may also be configured to notify the user 110 and/or an administrator of any unauthorized activity so that appropriate action can be taken. The system 10 may also be configured to sound appropriate alarms and/or send messages should a user fail to be identified or authenticated. The system 10 can also be configured to take and retain photographic or video evidence of the unauthorized activity, and of the associated individual. In some cases, however, the identification/authorization system can be omitted, and the system 10 may only track the dispensing/return of items and not necessarily the identify of the users. All of these activities and options, with respect to access, identification and authentication, or lack thereof, can also be applied to the various other cabinets, systems, dispensers and the like described elsewhere herein.

Figure 22:
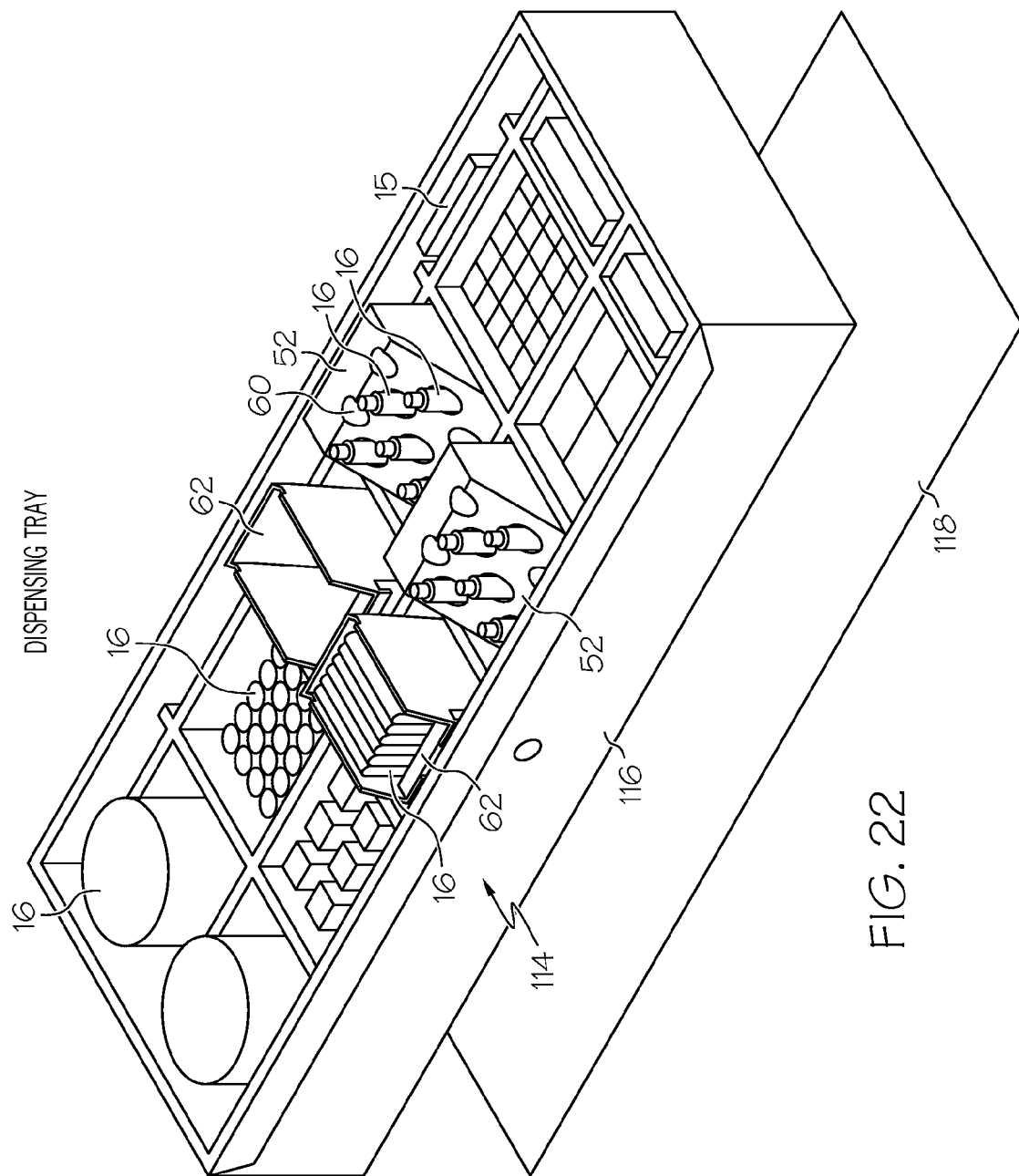
FIG. 22 is a front perspective view of a dispensing tray.

As shown in FIG. 22, the system may utilize or take the form of a "cabinet" 12 or sub-assembly 114 which can be manually carried and utilizes and/or incorporates a plurality of sensors and dispensers, including those described above. In the illustrated example, the sub-assembly 114 takes the form of a tray 116 with various sensor, dispensers (dispensers 52 and 62 in the illustrated embodiment), and items 16 stored therein. The tray may 116 be sized to generally correspond to a particularly-sized shelf 118 such that the tray 116 can entirely occupy an entire shelf 118 for storage or use.

The sub-assembly 114 may include a controller 15 coupled thereto or incorporated therein. In the illustrated embodiment the controller 15 is a wireless controller and can communicate wirelessly with other sub-assemblies 114 and/or controllers 15. However, the sub-assembly 114 may also lack a separate controller 15, and/or be configured to be connected to other sub-assemblies 114/controllers 15 or other components by a wired or wireless connection.

The subassembly 114/tray 116 provides a modular system in which a number of items 16, sensors and dispensers are carried on single subassembly 114/tray 116. In one case, each of the items 16/dispensers carried on the tray 116 are related and can be used for the same or related tasks. For example, in one case the subassembly 114/tray 116 stores items used in a paint booth, such as masking tape, cleaning compounds, a flashlight, polishing compound, spray paint, etc. The user may carry the subassembly 114/tray 116 to a work site and use the items 16. The use/consumption of items 16 can be tracked at the work site and/or when the subassembly 114/tray 116 is returned to its original/storage position. The use of such subassemblies 114/trays 116 also enables various subassemblies 114/trays 116 to be swapped out as desired, to enable quick replacement of items 16, sensor and dispensers, etc.

Each user may have his or her own subassembly 114/tray 116 which the user uses for his or her job, or alternately subassemblies 114/trays 116 may be commonly used and shared. In one case, the subassemblies 114/trays 116 may be configured to physically interlock with adjacent subassemblies 114/trays 116 to form an integral system. In this case besides being physically coupled the controllers 15/sensor of the subassemblies 114/trays 116 may also be operatively coupled to form a mesh-type network.

The subassembly concept can be applied to even a single dispenser, item and/or sensor if desired. For example, the dispensers 62 of FIG. 11 are each operatively coupled to a single controller 15, and FIGS. 5 and 6 illustrate the dispenser 30/sensor 46 operatively coupled to, or including, its own controller 15. Thus, each dispenser can be operatively coupled to its own controller 15, or various dispensers can share a controller 15. Each dispenser can be used separately and apart from a storage cabinet, and can be carried on-site to a work location.

It can therefore be seen that a storage component, as described and shown herein, can take the form of a cabinet 12 as shown in FIGS. 1-4, any of the dispensers shown in FIGS. 5-19, the room/walk-in cabinet 12 shown in FIG. 20, the shelf shown in FIG. 21, the tray 116 shown in FIG. 22, or various other forms. A storage component can also take the form of various subcomponents of such devices, such as an individual dispenser in a cabinet 12, or a compartment or shelf of a cabinet 12 which has sensors to track dispensing/return activities, or dispensers/compartments/shelves of the walk-in cabinet 12 of FIG. 20, of shelf of FIG. 21 or of tray 116 of FIG. 22. In other words, a single larger storage component, such as a cabinet 12, room/walk-in cabinet 12, shelf, tray 116 or the like can itself store or receive other smaller storage components therein.

Figure 23:
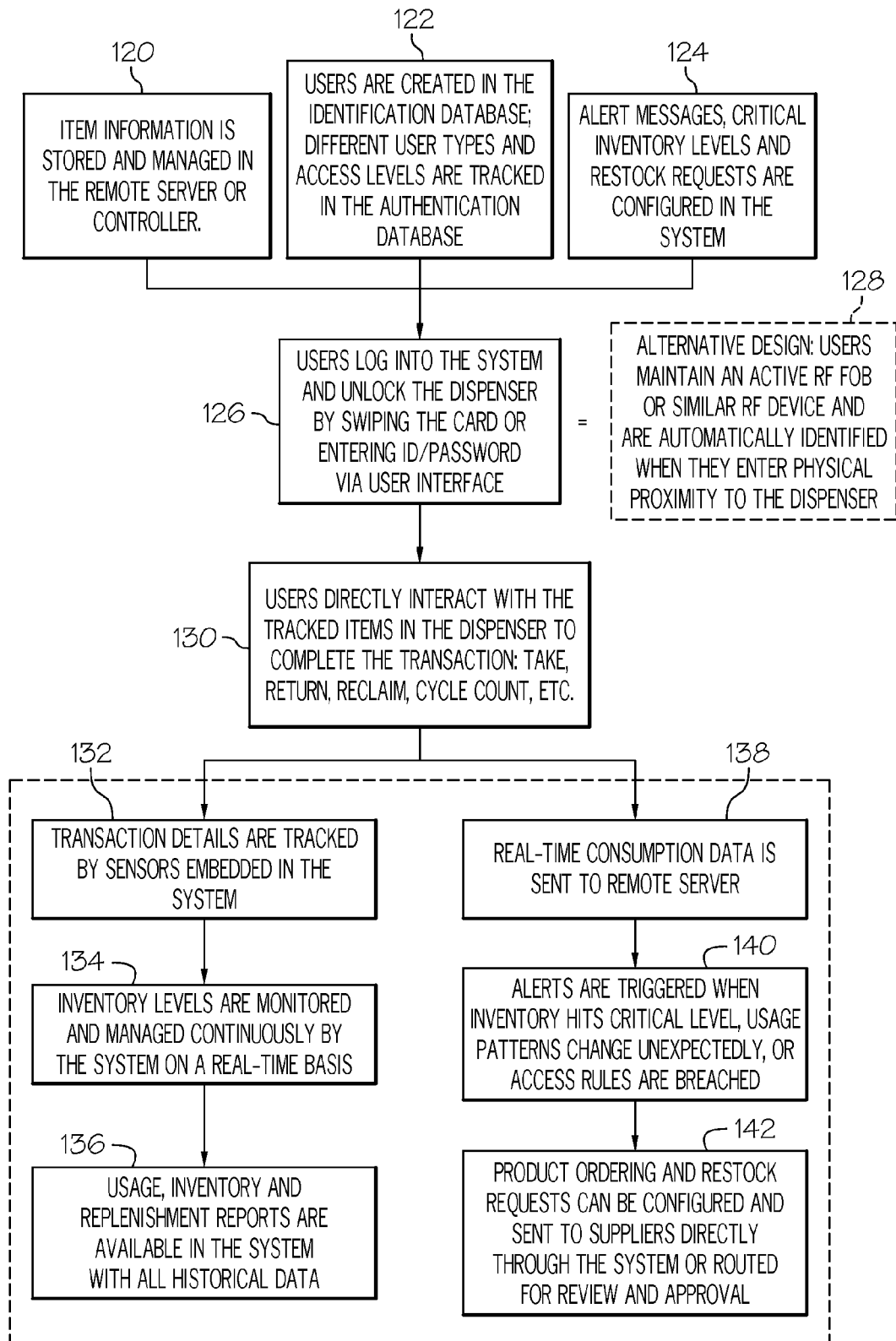
FIG. 23 is a flow chart showing operations for managing and operating a dispensing system.

FIG. 23 illustrates one embodiment of the basic workflow and operations of one embodiment of the storage system as disclosed herein. As shown at step 120 of FIG. 23, information relating to the items 16, such as their properties (including in at least some cases weight, cost, function, expected usage, shape, etc.), the number of items 16 in the storage component, the location of the items 16 in the storage component, etc, is entered. At step 122, the various users and their properties (such as identification, biometric or other identifiers, etc.) are stored in the identification system/database, and differing user types and access levels (such as types of projects the users may work on, specific project and/or items which the users can access, etc.) are stored. The item information, identification system/database and authentication database may be stored at a local controller 15, at the remote server 17, or elsewhere. At step 124, alert messages, critical inventory levels, and restock request information is entered into the system.

At step 126, users may log into the system and unlock the cabinet, in the manner described above and shown in FIGS. 1-4 and 20. Alternately, at step 128, users may be physically identified as the users approach the dispenser, as described above. Further alternately, as outlined above, the users may, in some cases, not be identified and/or authenticated. At step 130, the users carry out the desired steps to complete their transaction, such as taking items, returning or reclaiming items, conducting a cycle (inventory) count, etc.

At step 132, the details of the transaction are tracked. At step 134, inventory levels within the dispenser, and/or within the system, are monitored and tracked. As noted at step 136, usage reports, inventory reports, and replenishment reports are made available. As noted at step 138, real-time consumption data may be sent to the remote server 17, and at step 140 alerts may be triggered when inventory falls below critical levels, when usage patterns changed unexpectedly, or when access rules are breached. As noted at step 142, the system 10 can be configured to order products, request restock, or other activities based upon data noted in the system 10. The system may be configured to take such actions automatically, or request human approval before proceeding.

Thus it can be seen that the access/dispensing/replenishment operations provided by the system 10 disclosed herein presents an intuitive, easy to operate and relatively "frictionless" transaction system in which a user can simply approach the storage component storing the desired items 16, identify themselves (if necessary), access the storage components/dispensers, retrieve or add the desired items 16, re-secure the storage cabinet 12 (if necessary) and return to his or her work station. For dispensing operations, the user is not required to make pre-selections via a user interface and wait for the machine to dispense, as in many previous systems.

Inventory can be replenished quickly and easily. The system 10 also requires less data entry, thereby improving the speed and efficiency of the user transaction without requiring extra effort on behalf of the user. Users are also given the opportunity to closely look at and interact with the items 16. This feature provides the user with more visibility of the items 16 and give the user more comfort in making their selections.

In addition, the variable configuration of the dispensers allows more items 16 to be made available in less space, thereby providing greater item density and space savings. For example, helix dispensing coils in tradition vending-style machines require significant space and are difficult to arrange efficiently. The use of the dispensers, as disclosed herein, allows items 16 to be placed directly therein and stacked closely and efficiently. Moreover, in traditional vending-style machines, each item must be modified for use with a helix coil, such as by the use of special packaging, or placing a hang-tag thereon. Thus the system 10 disclosed herein reduces the use of special packaging, and enables easier refilling and dispensing of items 16.

In some existing systems, items are tracked by attaching an RFID tag (or other sensor component) to each item and then tracking movement of the RFID tag. However, such a system requires that each individual item be tagged/modified (i.e. using an electronic tag such as an RFID tag) and monitoring each individual item 16. In contrast, the present system 10 can operate by effectively monitoring the space within the system, and does not require the use of any RFID tag, does not require that the items 16 be modified/tagged and operates independently of any sensor component (such as an RFID tag/antenna) secured to the item 16. Thus the system 10 can, in some cases, effectively monitor the actions of the user, instead of movement of the actual items, thereby resulting in a smooth, easy-to-implement tracking system. The system 10 thus may not directly track movement/ dispensing of the items, but may instead track movement/dispensing of items by deductive reasoning.

The system enables a company/operator to disperse a plurality of dispensers throughout the plant/floor of a company's operations, thereby pushing items 16 out so that they are physically closer to their users and point of use. This reduces or eliminates users having to leave their work areas to request materials from a tool crib or store room, and the user can instead easily obtain desired items 16 near their work space. The system can also aid during restocking of items or the return of items, and can send a signal or an output when an item is returned/stocked in the incorrect position. The system 10 may also be able to track the return of items 16 to positions other than their original storage positions (i.e. placement in other similar dispensers, placement on another position on the "sensor board" dispenser 102, or by motion sensor tracking etc.)

Since each of the dispensers is connected to the controller 15, the identification of each item taken or added by a user, as well as the quantity/volume/weight of each item, can be tracked by the controller and/or by the system's software, which may be remotely hosted. The controller can then forward the identity and count of items to the server 17, along with the identity of the user, the time of dispensing/replenishment, and other pertinent details. The server 17 can thereby consolidate inventory from all dispensers for a particular company, or all inventory for that company or location, track usage patterns, etc., such that the inventory can be tracked and replenishment of supplies can be ordered as necessary, providing automated and easy-to-manage inventory management.

The system 10 also enables automated work flow of generating and sending item ordering requests to a supplier or distributor, and eliminates manual checking of inventory levels. In addition, the system 10 can eliminate additional human resources needed to monitor a tool crib or store room and thereby help to reduce human generated errors. The system 10 enables usage reports to be generated to track usage by particular users, groups of users, timing of work requests, etc. to improve efficiency and reduce waste and redundancy. The data can then be used by suppliers and user companies to analyze and predict production levels and market trends. The system 10 thereby enables lean manufacturing and lean logistics practices.

The system 10 can also be configured to track use of items on a project-by-project basis. Thus, for example, each user may be required to enter a project identification, such as a project number, for each dispensing/use activity. Alternately, or in addition, the system 10 may be configured to assign all of a user's dispensing/use activity to a certain project during certain time periods, be able to automatically assign a user's activities to a particular project based upon programmed logic. In this manner, resource usage can be tied to a project for tracking efficiencies, cost allocation, billing, or other purposes.

The controllers 15 can be connected to each other, and/or to the remote server 17 by any variety of means. In one embodiment, each dispenser/storage cabinet 12/controller 15 is directly connected to the Internet to thereby upload dispensing and other data to the other controllers 15 and/or server 17 via the Internet. Each authorized user (i.e. company administrator) can then access information relating to the dispensing operations of the system 10 owned, controlled, or possessed by that company, such as by use of a web browser. Furthermore, rather than having each system be connected to the Internet, a plurality of local storage cabinets 12/dispensers may be coupled to a single controller 15 which is, in turn, coupled to the Internet. Each of the local dispensers/storage cabinets/storage components (and their controllers) can be connected to each other, a local controller 15 and/or the remote server 17 by a wired connection, wireless connections or the like, including Ethernet, Zigbee, Wi-Fi, cellular, or other network or communication protocols.

The system 10 and dispensers/storage components can be used to store and track the removal/dispensing of any of a wide variety of items 16 having a variety of shapes, structures and configurations, and can be used in a variety of industries, including metal working, machine shops, maintenance areas, process industries, mining, transportation, laboratories, utilities, healthcare and medical, construction, automotive, manufacturing, refineries, food and chemical processing plants, aerospace and aircraft maintenance, railroads and transportation, retail, restaurants, and nearly any other industry sector that involves logistics and supply chain management. The system 10/dispensers can also be utilized in mobile environments, such as trucks or vans (i.e. for service departments), railroads, airplanes, or on mobile carts or trays, etc. The system 10 can be utilized to track both inventory and assets.

The controller 15, server 17 and other similar devices described herein can take the form of controllers, processors, computers, computer components and elements of a computer, such as hardware, firmware, virtualized hardware and firmware, a combination thereof, or software in execution. The controller 15, server 17 or other similar devices can run software thereon to carry out the desired function. "Software" in this case means one or more computer readable and/or executable instructions that cause a computer, personal electronic device or other electronic device to perform functions, actions and/or behave in a desired manner. The instructions may be embodied in various forms such as routines, algorithms, modules, methods, threads, and/or programs. Software may also be implemented in a variety of executable and/or loadable forms including, but not limited to, stand-alone programs, function calls (local and/or remote), servelets, applets, instructions stored in a memory, part of an operating system or browser, bytecode, interpreted scripts and the like. It should be appreciated that the computer readable and/or executable instructions can be located in one computer or the like and/or distributed between two or more communicating, co-operating, and/or parallel processing computers or the like and thus can be loaded and/or executed in serial, parallel, massively parallel and other manners. It should also be appreciated that the form of software may be dependent on various factors, such as the requirements of a desired application, the environment in which it runs, and/or the desires of a particular designer/programmer. The software may be stored in a tangible medium, and/or on a computer readable storage medium or memory device.

Although the invention is shown and described with respect to certain embodiments, it should be clear that modifications will occur to those skilled in the art upon reading and understanding the specification, and the present invention includes all such modifications.

What is claimed is:
1. An access and storage system comprising:
   a plurality of manually-carryable storage components positionable on or in a storage area, wherein each of said plurality of manually-carryable storage components is configured to store items therein or thereon in associated storage positions, wherein each of said plurality of manually-carryable storage components is configured to provide an associated user with direct manual access to said items in said associated storage positions, and wherein access to each of the plurality of manually-carryable storage components is restricted to the associated user of the respective manually-carryable storage component;

a sensor system configured to track said associated user's removal of an item from the associated storage position and replacement of the item to the associated storage position, the sensor system having at least one on/off presence sensor configured to detect the removal and replacement of the item from the associated storage position, wherein the sensor system is operable to track said removal and replacement of the item when the manually-carryable storage component is positioned on or in the storage area and to track said removal and replacement of the item when the manually-carryable storage component is not positioned on or in the storage area; each of the plurality of manually-carryable storage components taking a form of a manually-carryable tray, the manually-carryable tray including a plurality of dispensers thereon, each dispenser being configured to contain and dispense a plurality of items and multiple on/off presence sensors are configured to detect the removal and replacement of individual items from each of the dispensers; wherein each of the plurality of dispensers is configured to dispense a plurality of items of only a single type per dispenser; wherein said sensor system is configured to track removal of any items from said dispenser; and wherein at least one dispenser of the plurality of dispensers comprises a plurality of on/off presence sensors arranged vertically along a height of the at least one dispenser to detect a level of a plurality of items contained within the at least one dispenser; and a controller operatively coupled to the sensor system, wherein the controller is configured to collect and store dispensing activity information from the sensor system when the manually-carryable storage component is remote from the storage area, and wherein the controller is configured to transmit the stored dispensing activity information to a remote server when the manually-carryable storage component is returned to the storage area, the storage area including a sensor configured to track the presence or absence of the manually-carryable storage component at the storage area.

2. The access and storage system of claim 1, wherein the controller is configured to wirelessly transmit the stored dispensing activity information to the remote server when the manually-carryable storage component is returned to the storage area.

3. The access and storage system of claim 1, wherein the plurality of dispensers are weight-based dispensers.

4. The access and storage system of claim 1, wherein at least one dispenser of the plurality of dispensers comprises a ramp, an on/off presence sensor, and an aperture positioned at the base of the ramp, wherein the aperture is configured to hold an item at the base of the ramp and the on/off presence sensor is positioned to trigger when a held item is manually removed from the aperture.

5. The access and storage system of claim 1, wherein the storage area comprises a shelf, and wherein the plurality of manually-carryable storage component are sized to generally correspond to the shelf.

6. An access and storage system comprising:

a plurality of manually-carryable storage components positionable on or in a storage area, wherein each of said plurality of manually-carryable storage components is configured to store items therein or thereon in individually associated storage positions, wherein each of said plurality of manually-carryable storage components is configured to provide an associated user with direct manual access to said items in said associated storage positions, and wherein access to each of the plurality of manually-carryable storage components is restricted to the associated user of the respective manually-carryable storage component;

a sensor system configured to track at least one of said associated user's removal of an item from the associated storage position and replacement of an item to the associated storage position, wherein the sensor system is operable to track said removal and replacement of the item when the manually-carryable storage component is positioned on or in the storage area and to track said removal and replacement of the item when the manually-carryable storage component is not positioned on or in the storage area, each of the plurality of manually-carryable storage components taking a form of a manually-carryable tray, the manually-carryable tray including a plurality of dispensers thereon, each dispenser being configured to contain and dispense a plurality of items and multiple on/off presence sensors are configured to detect the removal and replacement of individual items from each of the dispensers; wherein each of the plurality of dispensers is configured to dispense a plurality of items of only a single type per dispenser; and wherein said sensor system is configured to track removal of any items from said dispenser; at least one dispenser of the plurality of dispensers being in form of a component with cut-out or recess form therein and configured to closely receive a particular item therein, and wherein the at least one dispenser utilizes a plurality of on/off presence sensors in the cut-out to avoid false-positive presence detections; and a controller operatively coupled to the sensor system, wherein the controller is configured to collect and store dispensing activity information from the sensor system when the manually-carryable storage component is remote from the storage area, and wherein the controller is configured to transmit stored dispensing activity information to a remote server when the manually-carryable storage component is returned to the storage area, the storage area including a sensor configured to track the presence or absence of the manually-carryable storage component at the storage area.

7. The access and storage system of claim 6, wherein the controller is configured to wirelessly transmit the stored dispensing activity information to the remote server when the manually-carryable storage component is returned to the storage area.

8. The access and storage system of claim 6, wherein the plurality of dispensers are weight-based dispensers.

9. The access and storage system of claim 6, wherein at least one dispenser of the plurality of dispensers comprises a plurality of on/off presence sensors configured to detect a level of a plurality of items contained within said at least one dispenser.

10. The access and storage system of claim 6, wherein at least one dispenser of the plurality of dispensers comprises a ramp, an on/off presence sensor, and an aperture positioned at the base of the ramp, wherein the aperture is configured to hold an item at the base of the ramp and the on/off presence sensor is positioned to trigger when a held item is manually removed from the aperture.

11. The access and storage system of claim 6, wherein the storage area comprises a shelf, and wherein the plurality of manually-carryable storage components are sized to generally correspond to the shelf.

\* \* \* \* \*